(12) United States Patent
Murakami et al.

(10) Patent No.: US 10,094,989 B2
(45) Date of Patent: Oct. 9, 2018

(54) OPTICAL DEVICE, OPTICAL PROCESSING DEVICE, AND METHOD OF PRODUCING THE OPTICAL DEVICE

(71) Applicant: SUMITOMO ELECTRIC INDUSTRIES, LTD., Osaka (JP)

(72) Inventors: Yasunori Murakami, Hiratsuka (JP); Akira Furuya, Hadano (JP); Koichi Koyama, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 14 days.

(21) Appl. No.: 15/421,965

(22) Filed: Feb. 1, 2017

(65) Prior Publication Data

US 2017/0227723 A1    Aug. 10, 2017

(30) Foreign Application Priority Data

Feb. 9, 2016   (JP) ................................ 2016-022662

(51) Int. Cl.
*G02B 6/42* (2006.01)
*G02B 6/30* (2006.01)
*G02B 6/36* (2006.01)

(52) U.S. Cl.
CPC ............. *G02B 6/4214* (2013.01); *G02B 6/30* (2013.01); *G02B 6/3644* (2013.01); *G02B 6/3668* (2013.01); *G02B 6/425* (2013.01); *G02B 6/4212* (2013.01); *G02B 6/4243* (2013.01); *G02B 6/4255* (2013.01)

(58) Field of Classification Search
CPC ...... G02B 6/4214; G02B 6/30; G02B 6/3644; G02B 6/3668; G02B 6/4212; G02B 6/4243; G02B 6/425; G02B 6/4255
See application file for complete search history.

(56) References Cited

U.S. PATENT DOCUMENTS

| 6,328,484 B1 * | 12/2001 | Uebbing | G02B 6/4246 |
|---|---|---|---|
| | | | 385/47 |
| 7,118,293 B2 * | 10/2006 | Nagasaka | G02B 6/4214 |
| | | | 385/89 |
| 7,248,768 B2 * | 7/2007 | Jeon | G02B 6/10 |
| | | | 385/39 |

(Continued)

FOREIGN PATENT DOCUMENTS

JP        04-308804       10/1992

*Primary Examiner* — Peter Radkowski
(74) *Attorney, Agent, or Firm* — Smith, Gambrell & Russell, LLP

(57) ABSTRACT

An optical device includes one or more optical fibers and a holder having a supporting block, a reflecting plate, and an intermediate layer. The supporting block has a first to a third end surfaces at one end. The first end surface extends from a bottom surface of the holder to claddings of the optical fibers. The second end surface extends along a first axis intersecting the first end surface. The third end surface is oblique with respect to the first axis at an angle greater than zero degrees and less than 90 degrees. The optical fibers extend in the supporting block and is exposed to the third end surface. The reflecting plate is provided on the third end surface via the intermediate layer. Light from the optical fiber passes through the third end surface which has some roughness, and is reflected by a surface of the reflecting plate.

7 Claims, 22 Drawing Sheets

(56) References Cited

U.S. PATENT DOCUMENTS

| | | | | |
|---|---|---|---|---|
| 7,366,380 B1* | 4/2008 | Peterson | ............... | G02B 6/4214 |
| | | | | 385/47 |
| 8,821,033 B2* | 9/2014 | Rosenberg | ............... | G02B 6/38 |
| | | | | 385/58 |
| 8,926,194 B2* | 1/2015 | Chang | ..................... | G02B 6/36 |
| | | | | 385/89 |
| 9,213,152 B2* | 12/2015 | Shastri | ..................... | G02B 6/42 |
| 2004/0202477 A1* | 10/2004 | Nagasaka | ............ | G02B 6/4214 |
| | | | | 398/138 |
| 2007/0077008 A1* | 4/2007 | Jeon | ........................ | G02B 6/10 |
| | | | | 385/49 |
| 2011/0188817 A1* | 8/2011 | Chang | ..................... | G02B 6/36 |
| | | | | 385/89 |
| 2013/0182996 A1* | 7/2013 | Shastri | ..................... | G02B 6/42 |
| | | | | 385/14 |
| 2013/0202253 A1* | 8/2013 | Rosenberg | ............... | G02B 6/38 |
| | | | | 385/70 |

* cited by examiner

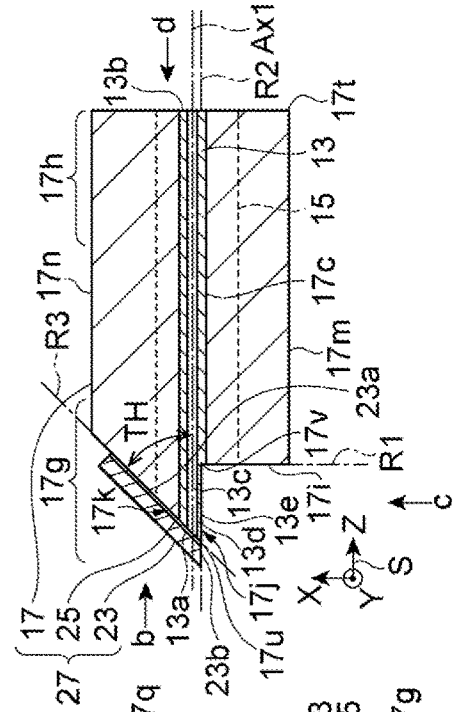
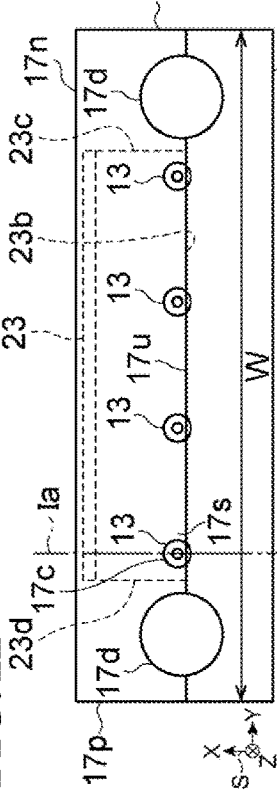
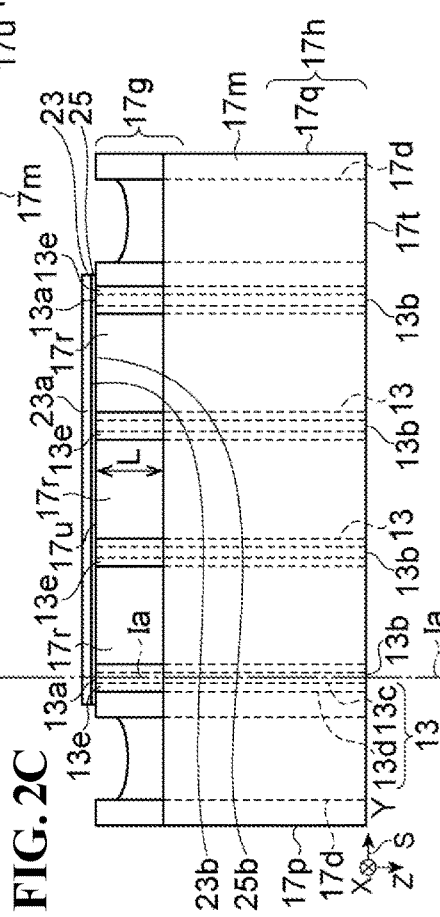
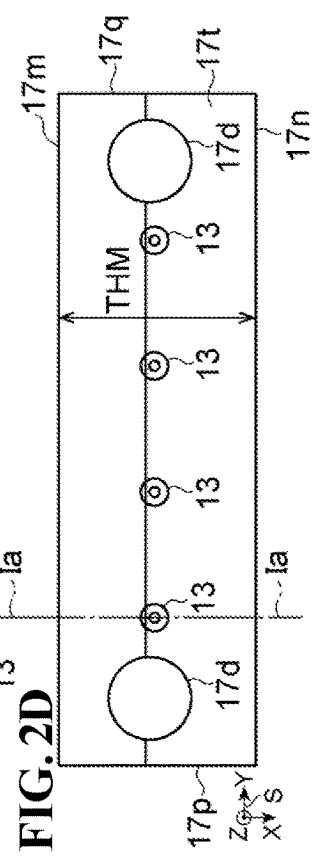

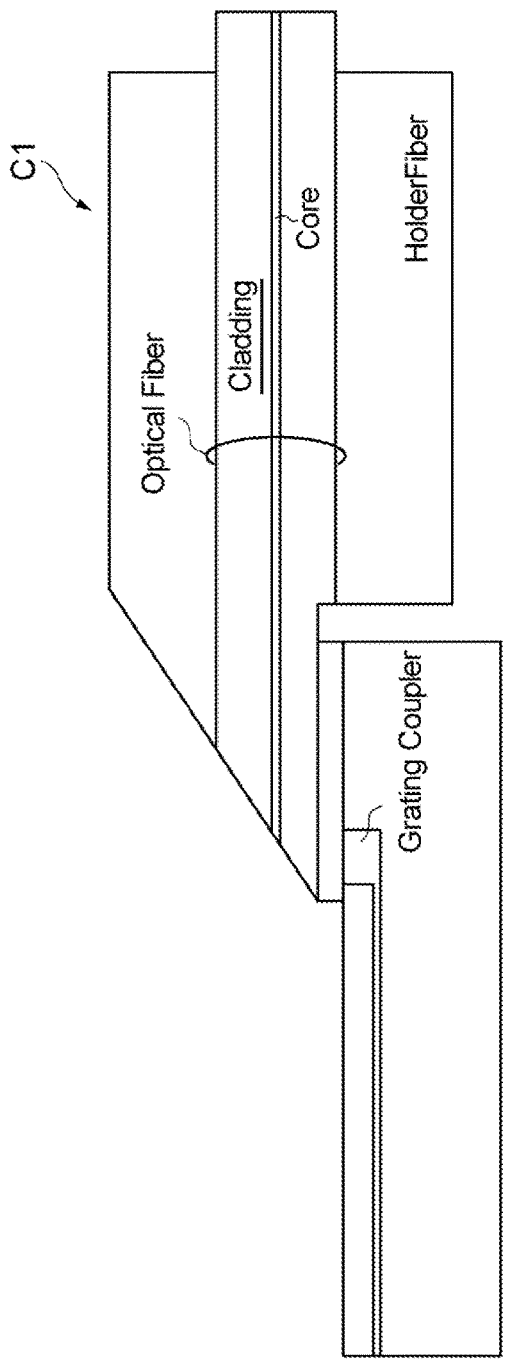
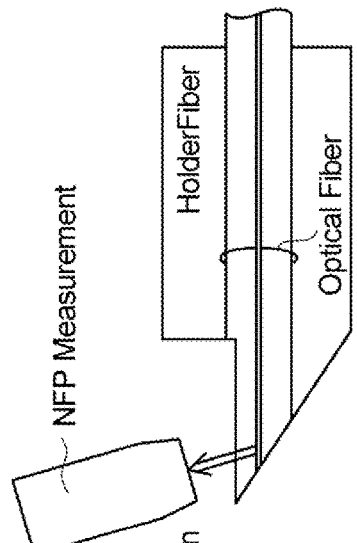
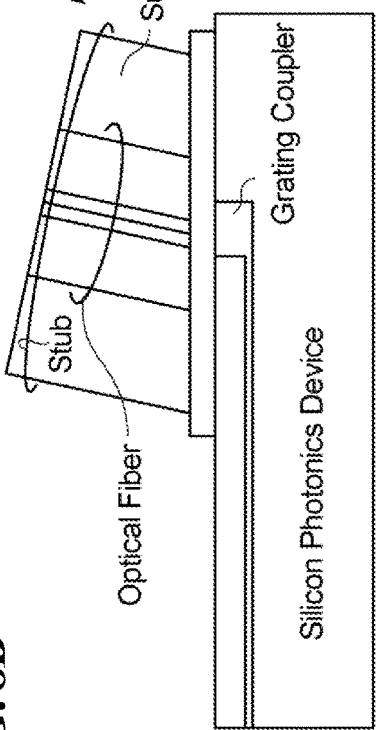
FIG. 8A
FIG. 8B
FIG. 8C

OPTICAL DEVICE, OPTICAL PROCESSING DEVICE, AND METHOD OF PRODUCING THE OPTICAL DEVICE

BACKGROUND OF THE INVENTION

1. Field of the Invention

The present invention relates to an optical device, an optical processing device, and a method of producing the optical device.

2. Description of the Related Art

Japanese Unexamined Patent Application Publication (JP-A) No. 4-308804 discloses the structure of an optical device in which an optical fiber end surface is machined at a bevel.

In JP-A No. 4-308804, an end facet of an optical fiber, whose glass surface is bare, is formed by a machine work so that the end facet is oblique with respect to the extending direction of the core of the optical fiber. Along with this, a part of the side surface of a cladding is formed flat so as to extend in the above-mentioned direction from the end of the optical fiber. The optical fiber has to be cut twice to form the oblique end facet and to form the flat cladding surface. In addition, in a process of fixing the optical fiber to an optical element, the bare glass surface of the optical fiber has to be handled.

SUMMARY OF THE INVENTION

In optical parallel transmission system for high speed of optical communication, multiple optical fibers have to be arranged in parallel and the optical fibers have to be coupled to an optical element in parallel. In such application, the oblique facets and the flat surfaces of the multiple optical fibers should have substantially the same shape. In addition, the machined facets of the optical fibers should be optically coupled in substantially the same manner.

According to the knowledge of the inventor, the oblique end facet of a single optical fiber has roughness caused by the machining, and the roughness causes diffuse reflection of the light from the optical fiber. The inclination angles of oblique end facets of multiple optical fibers have a variation depending on the machining, and the roughness of the oblique end surfaces also varies.

An optical device according to an aspect of the present invention includes: one or more optical fibers each having a core and a cladding surrounding the core; and a holder including a supporting block having one end, the other end, and a supporting portion supporting the optical fibers, the one end including a first to a third end surfaces; a reflecting plate provided on the third end surface; and an intermediate layer including an optical resin provided between the third end surface and the reflecting plate. The supporting portion extends in a direction of a first axis from the one end to the other end. The first end surface of the one end extends from a bottom surface of the holder to the claddings of the optical fibers along a first reference plane that intersects the first axis. The second end surface of the one end and a lateral surface of the reflecting plate extend along a second reference plane that lies in a direction of the first axis, the third end surface of the one end extends along a third reference plane that is oblique with respect to the first axis at an angle greater than zero degrees and less than 90 degrees, and the claddings of the optical fibers are disposed at the second end surface, and the optical fibers have respective facets exposed at the third end surface.

An optical processing device according to another aspect of the present invention includes a semiconductor optical device including an optical coupling element and an optical processing element connected to the optical coupling element; an optical device provided on the semiconductor optical device. The optical device includes one or more optical fibers each including a core and a cladding surrounding the core; and a holder including a supporting block having one end including a first to a third end surfaces, the other end, and a supporting portion supporting the optical fibers; a reflecting plate provided on the third end surface; and an intermediate layer including an optical resin provided between the third end surface and the reflecting plate. The supporting portion extends in a direction of a first axis from the one end to the other end. The first end surface of the one end extends from a bottom surface of the holder to claddings of the optical fibers along a first reference plane that intersects the first axis. The second end surface of the one end and a lateral surface of the reflecting plate extend along a second reference plane that lies in a direction of the first axis. The third end surface of the one end extends along a third reference plane that is oblique with respect to the first axis at an angle greater than zero degrees and less than 90 degrees. The claddings of the optical fibers are disposed at the second end surface. The optical fibers have respective facets exposed at the third end surface. The optical coupling element is coupled to one of the optical fibers of the optical device through the second end surface.

A method of producing an optical device according to further another aspect of the present invention includes the steps of: forming a first body part including a supporting member having one end and the other end, and an optical fiber part being supported in the supporting member, the optical fiber part extending in a first direction from the one end to the other end; after forming the first body part, machining the one end of the supporting member and the optical fiber part to form a machined surface in the first body part; after forming the machined surface, forming a second body part including the supporting member, a reflecting member provided on the machined surface, and an optical resin body provided between the machined surface and the reflecting member; and after forming the second body part, processing the reflecting member, the optical resin body, the supporting member, and the optical fiber part to form a third body part including a first surface and a second surface. The first surface extends along a first reference plane that intersects the first direction. The second surface extends along the second reference plane that intersects the first reference plane. The first surface of the third body part reaches from a bottom surface of the supporting member to a cladding of the optical fiber part. The second surface of the third body part includes a lateral surface of the reflecting member, a surface of the supporting member, and a surface of the cladding of the optical fiber part. In the step of forming the machined surface, the machined surface extends along a third reference plane that is oblique with respect to the first direction at an angle greater than zero degrees and less than 90 degrees.

The above-mentioned objects and other objects, characteristics, and advantages of the present invention will become apparent more easily from the following detailed description of a preferred embodiment with reference to the accompanying drawings.

BRIEF DESCRIPTION OF THE DRAWINGS

FIGS. 2A to 2D are views schematically showing the optical device according to the present embodiment.

FIGS. 8A to 8C are views schematically showing an experiment conducted by the inventor.

DESCRIPTION OF THE PREFERRED EMBODIMENTS

Figure 1A:
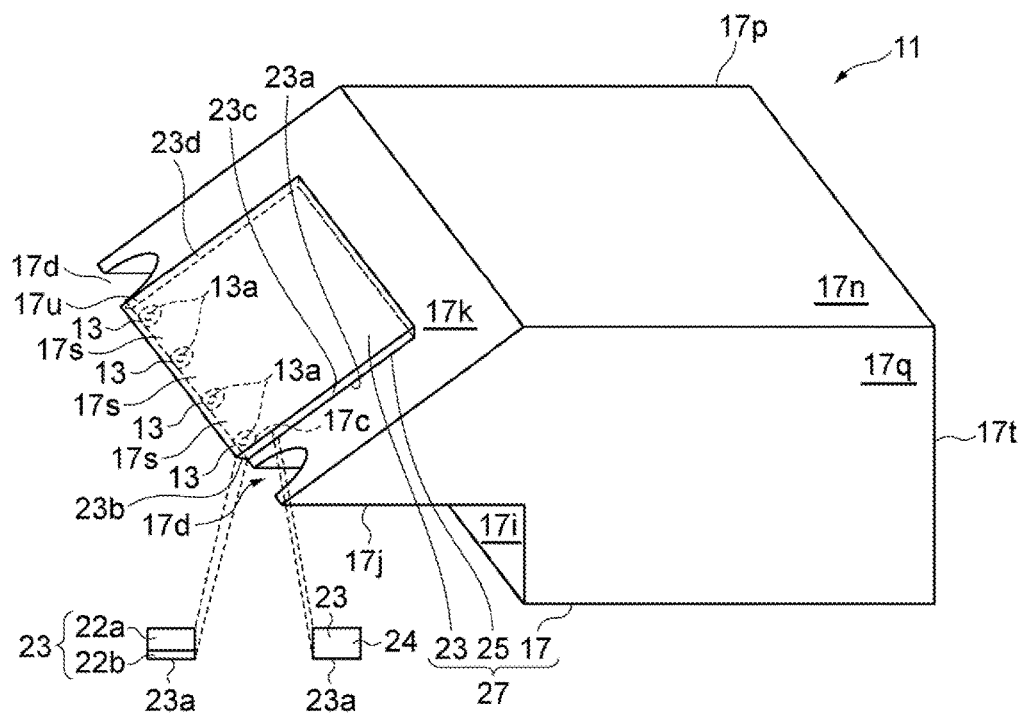
FIGS. 1A and 1B are views schematically showing an optical device according to the present embodiment.
Figure 1B:
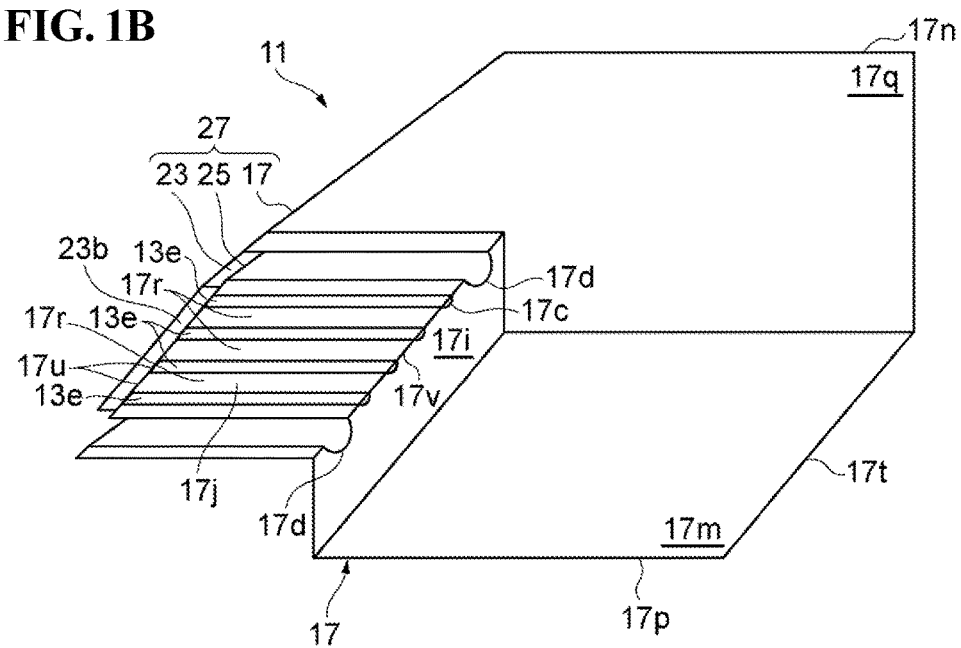

Some specific examples will be described in the following.

An optical device according to an embodiment includes: (a) one or more optical fibers each including a core and a cladding surrounding the core; and (b) a holder including a supporting block having one end, the other end, and a supporting portion supporting the optical fibers, the one end including a first to a third end surfaces; a reflecting plate provided on the third end surface; and an intermediate layer including an optical resin provided between the third end surface and the reflecting plate. The supporting portion extends in a direction of a first axis from the one end to the other end. The first end surface of the one end extends from a bottom surface of the holder to claddings of the optical fibers along a first reference plane that intersects the first axis. The second end surface of the one end and a lateral surface of the reflecting plate extend along a second reference plane that lies in the direction the first axis. The third end surface of the one end extends along a third reference plane that is oblique with respect to the first axis at an angle greater than zero degrees and less than 90 degrees. The claddings of the optical fibers are disposed at the second end surface, and the optical fibers have respective facets exposed at the third end surface.

In the optical device, an intermediate layer is provided between a reflective surface of the reflecting plate and the third end surface. The intermediate layer includes optical resin having a refractive index substantially matching the refractive index of the optical fibers. The optical resin reduces the influence of roughness of the third end surface on the light that passes through the interface between the third end surface and the intermediate layer.

In an optical device according to an embodiment, the supporting block has a through hole that extends from the one end to the other end. The reflecting plate has a side surface. The side surface of the reflecting plate is arranged between an outermost fiber of the optical fibers and the through hole in the third end surface.

In the optical device, since the side surface of the reflecting plate is arranged between the outermost fiber of the optical fibers and the through hole in the third end surface, the reflecting plate covers the all facets of the optical fibers exposed in the third end surface. Thus, the light output from each facet of the optical fiber is reflected without exception. In addition, as the reflecting plate is put separated from the through hole on the third end surface, use of the through hole is not interfered by the reflecting plate.

In an optical device according to an embodiment, the reflecting plate includes either one of a metal film, a dielectric multilayer, and both a metal film and a dielectric multilayer that provides the reflective surface.

The optical device allows a desired reflection film to be provided on the reflective surface of the reflecting plate.

In an optical device according to an embodiment, the optical fibers are arranged along a plane parallel with the first axis. The holder has a first area located between the claddings of the optical fibers in the second end surface. The facets of the optical fibers are arrayed along a connecting edge which the second end surface and the third end surface share.

According to the optical device, the light from each optical fiber is not reflected by the facet of the optical fiber exposed to the third end surfaces, but is reflected by the reflective surface of the reflecting plate. Since the reflective surface is flatter than the facets in the third end surface, the diffuse reflection of light output from the optical fiber is avoided.

In an optical device according to an embodiment, the optical fibers include a first portion and a second portion. The first portion extends in the holder, and the second portion that extends outward from the other end of the holder.

The optical device provides a pigtail-type optical coupling device.

In an optical device according to an embodiment, the optical fibers extend from the one end of the holder to the other end within the holder.

The optical device provides a stub-type optical coupling device.

An optical processing device according to an embodiment includes (a) a semiconductor optical device including an optical coupling element and an optical processing element, the optical processing element being connected to the optical coupling element; and (b) an optical device provided on the semiconductor optical device. The optical device including: one or more optical fibers each including a core and a cladding surrounding the core; and a holder including a supporting block having one end including a first to a third end surfaces, the other end, and a supporting portion supporting the optical fibers; a reflecting plate provided on the third end surface; and an intermediate layer including an optical resin provided between the third end surface and the reflecting plate. The supporting portion extends in a direction of a first axis from the one end to the other end. The first end surface of the one end extends from a bottom surface of the holder to claddings of the optical fibers along a first reference plane that intersects the first axis. The second end surface of the one end and a lateral surface of the reflecting plate extend along a second reference plane that lies in a direction of the first axis. The third end surface of the one end extends along a third reference plane that is oblique with respect to the first axis at an angle greater than zero degrees and less than 90 degrees. The claddings of the optical fibers are disposed at the second end surface. The optical fibers have respective facets exposed in the third end surface. The optical coupling element is coupled to one of the optical fibers of the optical device through the second end surface.

With the optical processing device, the optical fibers of the optical device is optically coupled to the optical coupling element of the semiconductor optical device via the reflecting plate of the holder.

An optical processing device according to an embodiment further includes a resin body that is provided between the second end surface of the optical device and the optical coupling element of the semiconductor optical device. The resin body is optically transparent in a wavelength of light to be processed by the optical processing device.

With the optical processing device, the optical device is optically coupled to the optical coupling element of the semiconductor optical device via the resin body with low coupling loss.

A method of producing an optical device according to an embodiment includes the steps of: (a) forming a first body part including a supporting member having one end and the other end, and an optical fiber part being supported in the supporting member, the optical fiber part extending in a first direction from the one end to the other end; (b) after forming the first body part, machining the one end of the supporting member and the optical fiber part to form a machined surface in the first body part; (c) after forming the machined surface, forming a second body part including the supporting member of the first body part, a reflecting member provided on the machined surface of the first body part, and an optical resin body provided between the machined surface and the reflecting member; and (d) after forming the second body part, processing the reflecting member, the optical resin body, the supporting member, and the optical fiber part to form a third body part including a first surface and a second surface. The first surface extends along a first reference plane that intersects the first direction, and the second surface extends along a second reference plane that intersects the first reference plane. The first surface of the third body part reaches from a bottom surface of the supporting member to a cladding of the optical fiber part. The second surface of the third body part includes a lateral surface of the reflecting member, a surface of the supporting member, and a surface of the cladding of the optical fiber part. In the step of forming the machined surface, the machined surface extends along a third reference plane that is oblique with respect to the first direction at an angle greater than zero degrees and less than 90 degrees.

In the method of producing an optical device, a first body part including the supporting member and the optical fiber part is machined, and a machined surface extending along the third reference plane is formed in the first body part. An optical resin body and a reflecting member are provided on the machined surface of the first body part to form a second body part. In the formation of the second body part, layers of the optical resin body and the reflecting member are formed on part or all of the machined surface. Machining of the second body part forms a first surface extending along a first reference plane that intersects a first direction, and a second surface that extends in the first direction along a second reference plane. In thus produced third body part, light, which transmits the optical device, is reflected not on the interface between the machined surface and the optical resin body, but on the reflective surface of the reflecting member. The reflected light is emitted from the optical device through the second surface.

The knowledge of the present invention can be readily understood in view of the following detailed description with reference to the accompanying drawings presented for illustration. Next, an embodiment of an optical device, an optical processing device, and a method of producing the optical device will be described with reference to the accompanying drawings. If possible, the same portions are labeled with the same symbol.

FIGS. 1A to 2D are views schematically showing the optical device according to the present embodiment. FIGS. 1A and 1B are illustrated as a perspective view to show the external appearance of an optical device 11. FIGS. 2B, 2C and 2D are illustrated as plan views in several directions to show the structure of the optical device 11. FIG. 2A shows a section taken along line Ia-Ia of FIGS. 2B, 2C and 2D. FIG. 2A shows three arrows (b, c, d) which indicate respective lines of sight for FIGS. 2B, 2C and 2D. In FIG. 2B, a dashed line indicates the position where a reflecting plate 23 is to be disposed.

The optical device 11 includes one or more optical fibers 13, a supporting block 17, a reflecting plate 23, and an intermediate layer 25. The supporting block 17, the reflecting plate 23, and the intermediate layer 25 form a holder 27. The holder 27 holds the optical fibers 13. Each of the optical fibers 13 includes one end 13a (facet 13a) and the other end 13b. In addition, each of the optical fibers 13 includes a core 13c and a cladding 13d. The surface of the one end 13a (facet 13a) includes surfaces of the core 13c and the cladding 13d. The reflecting plate 23 has a reflective surface 23a, a lateral surface 23b, a side surface 23c (the other side surface 23d). The reflective surface 23a has a mirror-like surface which is optically flat. The reflective surface 23a reflects the light output from each optical fiber 13. The intermediate layer 25 includes the optical resin body. The intermediate layer 25 has a contact surface that matches surface shape of the facet 13a having some the roughness. The intermediate layer 25 fills the gap between the facet 13a of the fiber 13 and the reflective surface 23a of the reflecting plate 23. The intermediate layer 25 embeds a roughness of the facet 13a. The intermediate layer 25 has a refractive index comparable to that of the cladding of the optical fiber 13. Therefore, the intermediate layer 25 reduces light reflection and/or light scattering caused by the roughness of the facet 13a. In other words, the reflective surface 23a receives the light from the facet 13a via the intermediate layer 25, and reflects the light. Alternatively, the facet 13a of the optical fiber 13 receives the light reflected by the reflective surface 23a via the intermediate layer 25. The material of the optical resin body may be, for instance, epoxy resin. The ratio of the refractive index of the intermediate layer 25 with respect to the refractive index of the core of the optical fiber 13 (i.e. the refractive index of the intermediate layer 25/the refractive index of the core of the optical fiber 13) is preferably in a range of 0.91 to 1.12. The thickness of the intermediate layer 25 may be, for instance, 0.1 μm or greater and 10 μm or less. The intermediate layer 25 needs to have a thickness of 0.1 μm or greater to cover the roughness generated in the fiber end surface. While light from the facet 13a of the optical fiber 13 transmits through the intermediate layer 25 which is a medium behaving as free space, the intermediate layer 25 with a thickness of 10 μm or less allows beam spread due to diffraction of the light to be reduced to a negligible level.

The resin body of the intermediate layer 25 sufficiently fills the roughness of the fiber end surface at the facet 13a, thereby reducing the optical roughness at the interface between the intermediate layer 25 and the fiber end surface at the facet 13a. When the fiber end surface at the facet 13a is made by cutting using a dicing machine, the surface of the facet 13a inevitably has some roughness. By disposing the intermediate layer 25 on the surface of 13a, light reflection and/or light scattering at the interface is reduced.

The reflecting plate 23 may include a base 24 and the reflective surface 23a. The reflective surface 23a is formed by polishing. Alternatively, the reflecting plate 23 may include a base 22a and a reflection film 22b provided on a surface of the base 22a. The reflection film 22b provides the reflective surface 23a.

Referring to FIGS. 1A and 1B and FIGS. 2A to 2D, the supporting block 17 has a supporting portion 17c for supporting the optical fiber 13. The supporting block 17 further includes one end 17g and the other end 17h, and the one end 17g is on the opposite side to the other end 17h. Also, the supporting portion 17c of the supporting block 17 extends from the one end 17g in the direction of a first axis Ax1, which is from the one end 17g to the other end 17h. The one end 17g has a first end surface 17i, a second end surface 17j, and a third end surface 17k. In the present embodiment, the first end surface 17i, the second end surface 17j, and the third end surface 17k constitute the one end surface of the one end 17g. The other end 17h has a fourth end surface 17t. The fourth end surface 17t constitutes the other end surface of the other end 17h. The intermediate layer 25 is provided on the third end surface 17k of the supporting block 17. Also, the supporting block 17 and the holder 27 have a first lateral face (a bottom surface) 17m, a second lateral face 17n, a third lateral face 17p, and a fourth lateral face 17q.

The first end surface 17i extends from an outer face (for instance, the first lateral face 17m) of the supporting block 17 to the cladding 13d of the optical fiber 13 along a first reference plane R1 which intersects (for instance, perpendicularly intersects) the first axis Ax1. The end of the first end surface 17i is separated from the core 13c. The second end surface 17j extends along a second reference plane R2 in a direction from the one end 17g to the other end 17h. The lateral surface 23b of the reflecting plate 23 and a lateral face 25b of the intermediate layer 25 also extend along the second reference plane R2. The third end surface 17k extends along a third reference plane R3 that is oblique with respect to the first axis Ax1 at an angle TH greater than zero degrees and less than 90 degrees. The cladding 13d of the optical fiber 13 is disposed at the second end surface 17j. The second end surface 17j of the supporting block 17 includes multiple first areas 17r composed of the material of the supporting block 17. The facet 13a of the optical fiber 13 is positioned in the third end surface 17k. The third end surface 17k of the supporting block 17 includes second areas 17s which are composed of the material of the supporting block 17 and which surrounds the facet 13a of the optical fiber 13.

As shown in FIGS. 1A to 2D, in the optical device 11, the optical fiber 13 extends along the second reference plane R2 from the one end 17g to the other end 17h, in the direction of the first axis Ax1. A cladding surface 13e of each optical fiber 13 is flat, and is positioned in the second end surface 17j of the supporting block 17, and extends along the second reference plane R2. The fiber end surface of the facet 13a of each optical fiber 13 is positioned in the third end surface 17k of the supporting block 17, and extends along the third reference plane R3. The second end surface 17j of the supporting block 17 has the multiple first areas 17r composed of the material of the supporting block 17, and the cladding surface 13e of the optical fiber 13 extends along the second reference plane R2 between the first areas 17r. The third end surface 17k of the supporting block 17 has the second areas 17s composed of the material of the supporting block 17, and the facet 13a of the optical fiber 13 extends along the third reference plane R3 between the second areas 17s. In this structure, each optical fiber 13 is positioned by the supporting block 17, and the fiber end surface at the facet 13a of the optical fiber 13 and the second areas 17s extend along the third reference plane R3. Also, the cladding surface 13e of the optical fiber 13 and the second areas 13r both extend along the second reference plane R2. The fiber end surface at the facet 13a of each optical fiber 13 is positioned in the third end surface 17k of the supporting block 17, and constitutes the interface between the fiber end surface and the intermediate layer 25. The light passing through the interface is reflected by the reflective surface 23a of the reflecting plate 23, and the transmission direction of the light is changed. The reflected light is emitted from the holder 27 via the intermediate layer 25. The incident light to the holder 27 is reflected by the reflective surface 23a of the reflecting plate 23, and the light transmission direction is changed. The reflected light passes through the above-mentioned interface and enters the optical fiber 13. In the optical device 11 shown in FIGS. 1A to 2D, the optical fibers 13 are arranged along the second reference plane R2. The first areas 17r in the second end surface 17j of the supporting block 17 are positioned between the claddings 13d of the optical fibers 13. The facet 13a of the optical fiber 13 is arranged in a connection part 17u at which the second end surface 17j and the third end surface 17k meet. The first areas 17r and the second areas 17s extend between the optical fibers 13, and the supporting block 17 firmly holds the outer circumference of the claddings of the optical fibers 13. The holding can prevent the direction of each optical fiber 13 from changing when the one end surface is formed. Formation of the first areas 17r and the second areas 17s of the supporting block 17 allows the cladding surfaces 13e to face in the same direction over the entire arrangement of the optical fibers 13. The optical fibers 13 are arranged along a single plane. In addition, the facets 13a of the optical fibers 13 are arranged along a single plane. The tips of the optical fibers are arrayed at a connecting edge which the second end surface 17j and the third end surface 17k share. The intermediate layer 25 is provided between the third end surface 17k of the supporting block 17 and the reflective surface 23a of the reflecting plate 23 so as to cover the fiber end surfaces of the facets 13a.

In the optical device, the intermediate layer 25 is provided between the reflective surface 23a of a reflecting plate (alternatively, reflective block) and the third end surface 17k. The intermediate layer 25 includes optical resin with a refractive index substantially matching the refractive index of the optical fiber 13, and the optical resin reduce the influence of the roughness of the third end surface 17k on the light that passes through the interface between the intermediate layer 25 and the third end surface 17k. For instance, the light passing through the interface is reflected by the reflective surface 23a of the reflecting plate 23, and the transmission direction of the light is changed. The reflected light is emitted from the holder 27 via the intermediate layer 25. The incident light to the holder 27 is reflected by the reflective surface 23a of the reflecting plate 23, and the light transmission direction is changed. The reflected light passes through the above-mentioned interface and enters the optical fiber 13.

In the optical device 11, the arrangement of the optical fibers 13 extends along the second reference plane R2 in the direction from the one end 17g to the other end 17h. In FIGS. 2A, 2B, 2C and 2D, an orthogonal coordinate system S is shown, and in the present embodiment, the optical fibers 13 are disposed in parallel on the plane determined by the Y-axis and the Z-axis of the orthogonal coordinate system S. Each first area 17r of the second end surface 17j of the supporting block 17 is positioned between the cladding surface 13e of an optical fiber 13 and the cladding surface 13e of an adjacent optical fiber 13. Each second area 17s of the third end surface 17k of the supporting block 17 is positioned between the oblique fiber end surface at the facet 13a of an optical fiber 13 and the oblique fiber end surface at the facet 13a of an adjacent optical fiber 13. The cladding surfaces 13e and the first areas 17r of the multiple optical fibers 13 are arranged along the second reference plane R2. The fiber end surfaces at the facets 13a of the multiple optical fibers 13 and the second areas 17s are arranged along the third reference plane R3.

Optical beams, which transmit the multiple optical fibers 13, pass through the interface between the intermediate layer 25 and the fiber end surfaces, positioned in the third reference plane R3, of the optical fibers 13, and the transmission direction of the passing optical beams is changed by the reflection on the reflecting plate 23. The reflected optical beam is emitted from the optical device 11 through the cladding surfaces 13e of the optical fibers 13 or the intermediate layer 25, or both. On the other hand, the transmission direction of multiple optical beams incident to the optical device 11 through the cladding surfaces 13e of the optical fibers 13 or the intermediate layer 25, or both, is changed by the reflection on the reflecting plate 23, and these reflected optical beams pass through the interface between the fiber end surfaces of the multiple optical fibers 13 and the intermediate layer 25 in the optical device 11, then enter the optical fibers 13. The optical device 11 is capable of reducing the optical loss caused by the roughness of the end surface of the facet 13a of each optical fiber 13 and coupling the facet 13a of the optical fiber 13 to an optical element.

The supporting block 17 may include a guiding portion 17d. The guiding portion 17d extends from the one end 17g to the other end 17h in the direction of the first axis Ax1. In the optical device 11, the guiding portion 17d is positioned with respect to the supporting portion 17c for the optical fibers 13 of the optical device 11. Therefore, the guiding portion 17d of the optical device 11 is useful in positioning the optical device 11 with respect to an optical element.

In the present embodiment, the guiding portion 17d may be a through hole extending from the one end 17g to the other end 17h in the direction of the first axis Ax1. The side surface 23c and the other side surface 23d of the reflecting plate 23 are separated from the edge of the facet 13a of each optical fiber 13 in the third end surface 17k, and are separated from the through hole of the guiding portion 17d on the third end surface 17k. In the optical device 11, the reflecting plate 23 is provided on the fiber end surfaces of the optical fibers 13 in the third end surface 17k and is separated from the edge of the facet 13a of each optical fiber 13, and thus the light from the fiber end surface of each optical fiber 13 is reliably reflected. The reflecting plate 23 is separated from the through hole 17d on the third end surface 17k. Thus, the distance between the facet 13a and the reflective surface 23a is kept constant along the third reference plane R3, even when a guide pin may protrude from the through hole 17d. The constant distance helps every light output from the optical fibers being equally reflected.

The distance between the edge of the through hole for the guiding portion 17d in the third end surface 17k and the side surface 23c (the other side surface 23d) of the reflecting plate 23 may be 100 µm or greater in order to maintain the uniformity of the intermediate layer 25.

In an embodiment, the optical fiber 13 may be a silica based single mode fiber. The material of the supporting block 17 may be, for instance, polyphenylene sulfide (heat resistant temperature is 150 degrees) containing silica filler, or a glass material. The pitch of the optical fibers 13 is, for instance, 250 µm, and the guiding portion 17d for a guide pin is, for instance, 700 µm in diameter. The length L of each first area 17r that supports the cladding surface 13e is, for instance, 1.5 mm in the direction from the connection part 17u to a connection part 17v in the second end surface 17j, and is preferably 1 mm or greater for appropriate optical coupling. The width of each second area 17s may be 3 mm or greater for appropriate optical fiber retention. Also, width W of the supporting block 17 may be, for instance, 6.4 mm, and thickness THM of the supporting block 17 may be, for instance, 2.4 mm.

Figure 3A:
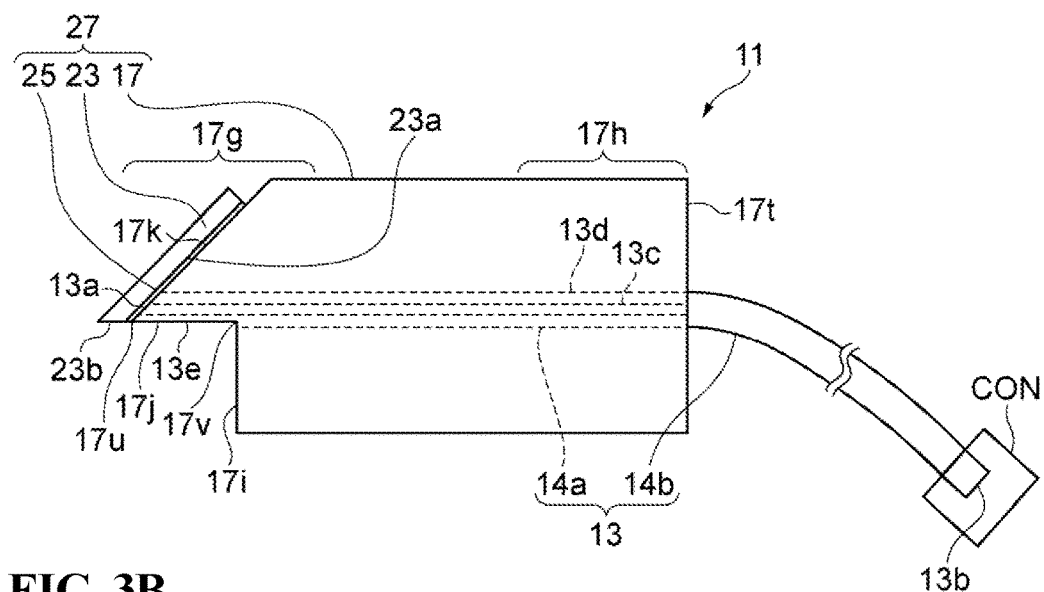
FIGS. 3A and 3B are views showing the typical structure of the optical device according to the present embodiment.
Figure 3B:
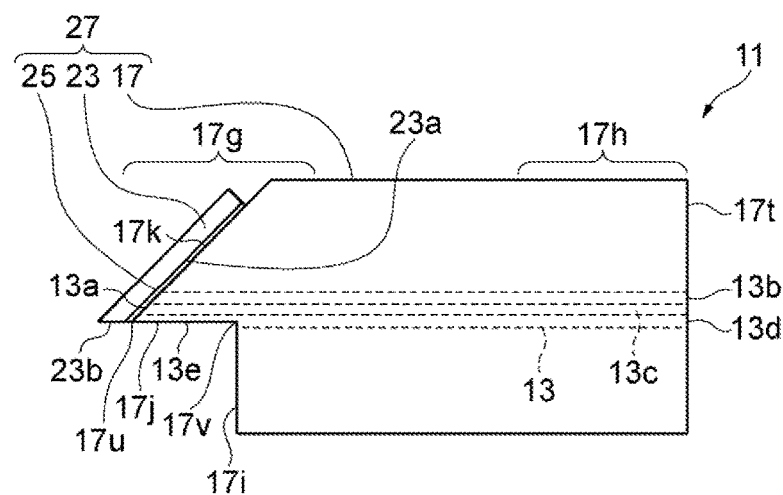

FIGS. 3A and 3B are views showing the typical structure of the optical device according to the present embodiment. Referring to FIG. 3A, a structure of the optical device 11 is shown. In the optical device 11 with this structure, each optical fiber 13 may include a first portion 14a that extends in the supporting block 17 and a second portion 14b that extends outward from the other end surface of the supporting block 17. In the present embodiment, the second portion 14b includes the other end 13b of the optical fiber 13, and the other end 13b is provided with an optical connector CON. With this structure, it is possible to achieve a pigtail-type optical device.

Figure 4A:
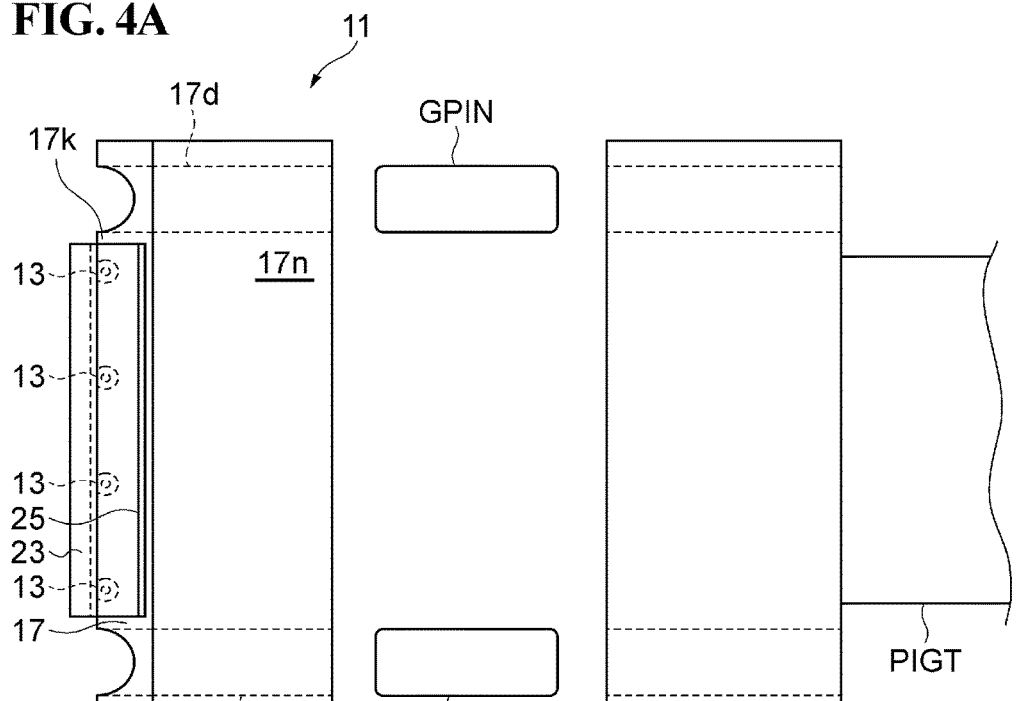
FIGS. 4A and 4B are views showing, for an instance, MT connector MTCON which is coupled to the optical device according to the present embodiment.
Figure 4B:
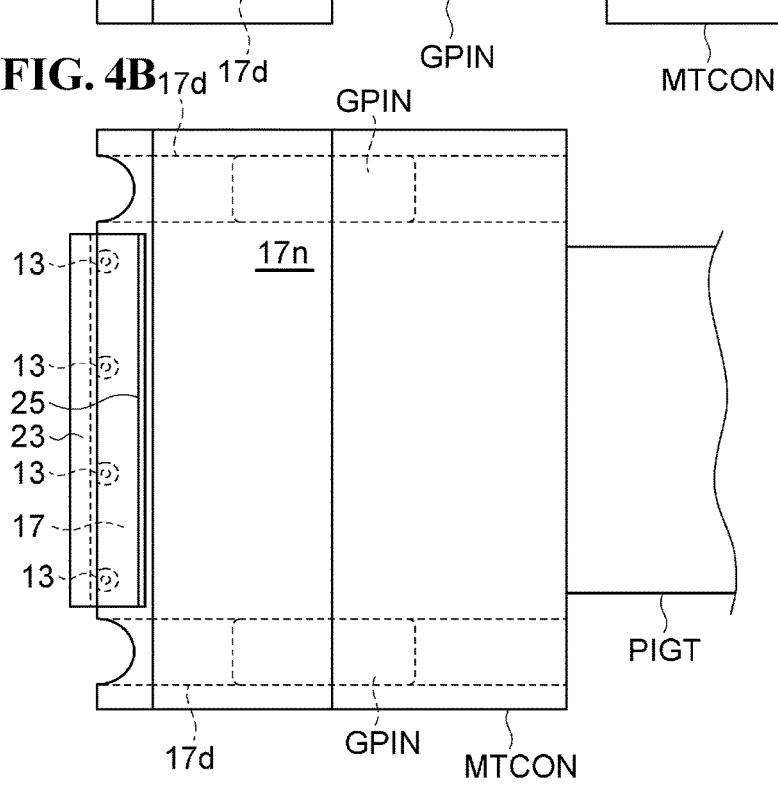

Referring to FIG. 3B, another structure of the optical device 11 is shown. In the optical device 11 with this structure, each optical fiber 13 extends from the one end 17g (specifically, the third end surface 17k) to the fourth end surface 17t within the supporting block 17. With this structure, it is possible to provide a stub-type optical device. In the present embodiment, as shown in FIGS. 4A and 4B, the fourth end surface 17t may be connected to, for an instance, the MT connector MTCON. Multiple optical fiber ends are arranged on one end surface of the MT connector MTCON, used as a connecting end surface, and as shown in FIG. 4A, the optical device 11, the MT connector MTCON, and a guide pin GPIN are prepared. A fiber ribbon PIGT, which bundles multiple optical fibers, extends from the other end surface of the MT connector MTCON. As shown in FIG. 4B, positioning by the guide pin GPIN allows the fiber end at the fourth end surface 17t of the optical device 11 to be optically positioned to the fiber end of the connecting end surface of the MT connector MTCON.

Figures 5A, 5B:
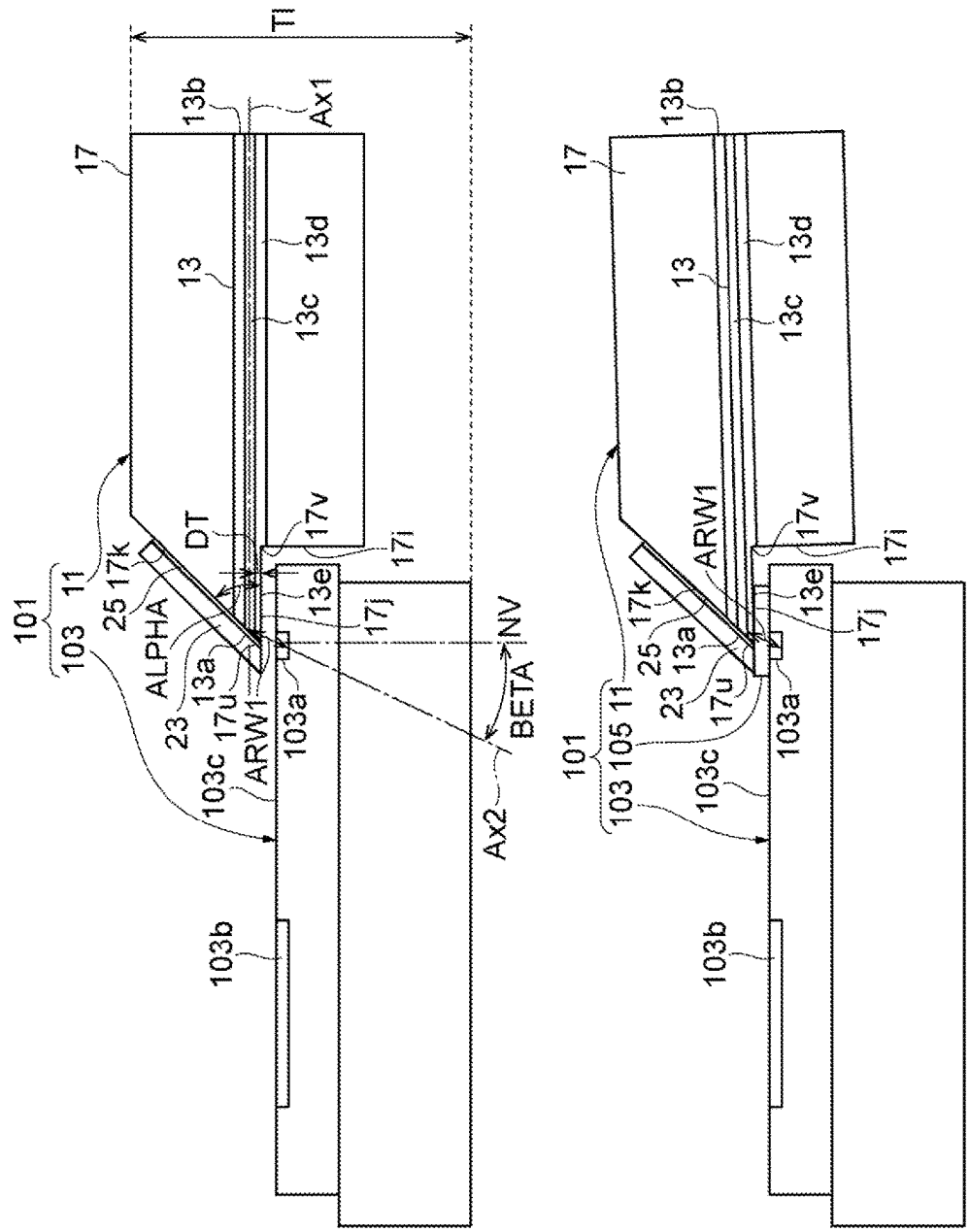
FIGS. 5A and 5B are views schematically showing an optical processing device according to the present embodiment.

FIGS. 5A and 5B are views schematically showing an optical processing device according to the present embodiment. Referring to FIGS. 5A and 5B, the optical processing device 101 includes the optical device 11 and a semiconductor optical device 103. The semiconductor optical device 103 include optical coupling elements 103a and optical processing elements 103b connected to the respective optical coupling elements 103a. The optical coupling elements 103a are provided in a major surface 103c of the semiconductor optical device 103. The optical device 11 is disposed on the semiconductor optical device 103. The optical fibers 13 of the optical device 11 are optically coupled to the respective optical coupling elements 103a of the semiconductor optical device 103 via the cladding surfaces 13e in the second end surface 17j of the supporting block 17 or the intermediate layer 25, or both. With the optical processing device 101, it is possible to provide favorable optical coupling between the optical device 11 and the semiconductor optical device 103. The optical coupling elements 103a may include, for instance, a grating coupler GC.

In this manner, the optical fibers 13 of the optical device 11 are optically coupled to the optical coupling elements 103a of the semiconductor optical devices 103 via the second end surface 17j of the supporting block 17. To illustrate the optical coupling, an arrow ARW1 and a second axis Ax2 (an axis extending in the direction of the arrow ARW1) are shown in FIGS. 5A and 5B. An optical beam, which has transmitted an optical fiber 13 of the optical device 11, passes through the interface between the facet 13a of the optical fiber 13 and the intermediate layer 25 and is reflected by the reflecting plate 23, then enters an optical coupling element 103a of the semiconductor optical device 103 via the cladding surface 13e or the intermediate layer 25, or both. Also, an optical beam emitted by the optical coupling element 103a of the semiconductor optical device 103 enters the reflective surface 23a of the reflecting plate 23 and is reflected by the reflective surface 23a as well as enters an optical fiber 13 via the interface between the facet 13a of the optical fiber 13 of the optical device 11 and the intermediate layer 25. The transmission direction (the second axis Ax2) crossing the cladding surface 13e forms a first angle BETA with respect to a normal axis NV of the major surface 103c, and the angle provides a coupling angle between each optical coupling element 103a of the semiconductor optical device 103 and the corresponding facet 13a of the optical device 11. As shown in FIG. 5A, The optical processing device 101 allows to reduce the thickness of the optical device 11 and the thickness of the semiconductor optical device 103 connected to the device 11, in short, thickness T1 of the optical processing device 101.

In order to enable optical coupling between the facet 13a of each optical fiber 13 of the optical device 11 and the corresponding optical coupling element 103a of the semiconductor optical device 103, a second angle ALPHA formed by the third reference plane R3 for the third end surface 17k and the second reference plane R2 for the second end surface 17j is related to the coupling angle of the optical coupling element 103a, that is an optical element to be coupled to the optical device 11. With the optical device 11, receiving of light from an optical element and/or emission of light to an optical element are facilitated.

As shown in FIG. 5B, the optical processing device 101 may further include a resin body 105 as needed. The resin body 105 is provided between the second end surface 17j of the optical device 11 and the optical coupling elements 103a of the semiconductor optical device 103, and it is preferable that the refractive index of the resin body 105 be substantially equal to the refractive index of the optical fibers 13. The resin body 105 is, for instance, an optical resin such as an epoxy resin. Light, which transmits the optical fiber 13, can pass through the resin body 105, and the light processed by the optical processing device 101 can pass through the resin body 105.

Optical beams, which transmit the optical fibers 13 of the optical device 11, exit from the facets 13a and transmit to the reflective surface 23a within the intermediate layer 25 which has no optical confinement structure. The beam spread in the reflective surface 23a depends on the thickness of the intermediate layer 25. The optical beams are reflected by the reflective surface 23a, and the reflected beams transmit to the optical coupling elements 103a of the semiconductor optical device 103 through the intermediate layer 25 or the facets 13a of the optical fibers 13, or both. On the other hand, optical beams emitted from the optical coupling elements 103a of the semiconductor optical device 103 transmit to the reflective surface 23a through the intermediate layer 25 without an optical confinement structure or the facets 13a of the optical fibers 13, or both. The optical beams are reflected by the reflective surface 23a, and the reflected beams transmit to the facets 13a of the optical fibers 13 through the intermediate layer 25. In either transmission, reflection for changing the direction of an optical path is causes by the reflective surface 23a. In the interface between the facet 13a of each optical fiber 13 and the intermediate layer 25, the light spread from the optical coupling element 103a of the semiconductor optical device 103 is larger than the light spread from the facet 13a of the optical fibers 13. The thickness of the intermediate layer 25 is substantially uniform in the third end surface 17k, specifically, at the facet 13a of each optical fiber 13 and in the vicinity of the facet 13a. Also, the intermediate layer 25 may be produced so as to have a substantially uniform thickness over the entire interface between the intermediate layer 25 and the third end surface 17k. A low viscosity resin with a pre-cured viscosity of 1000 cp or less is used as a component of the intermediate layer, and the reflecting plate 23 is pressed against the third end surface 17k and is cured, thereby forming the intermediate layer with a uniform thickness. It is preferable that the pressing be performed approximately uniformly.

Figure 6:
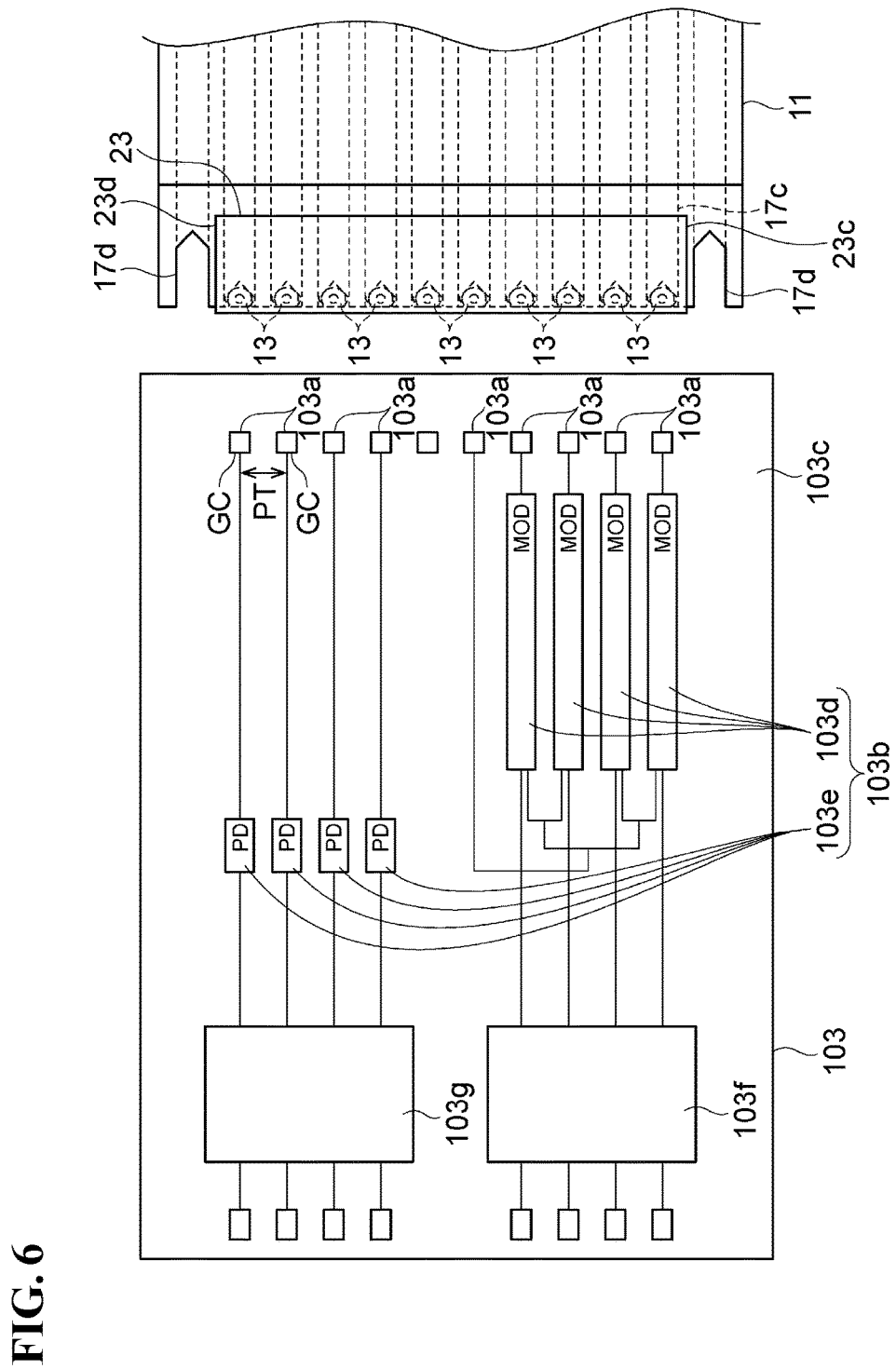
FIG. 6 is a plan view schematically showing the optical device and a silicon photonics device according to the present embodiment.
Figure 7:
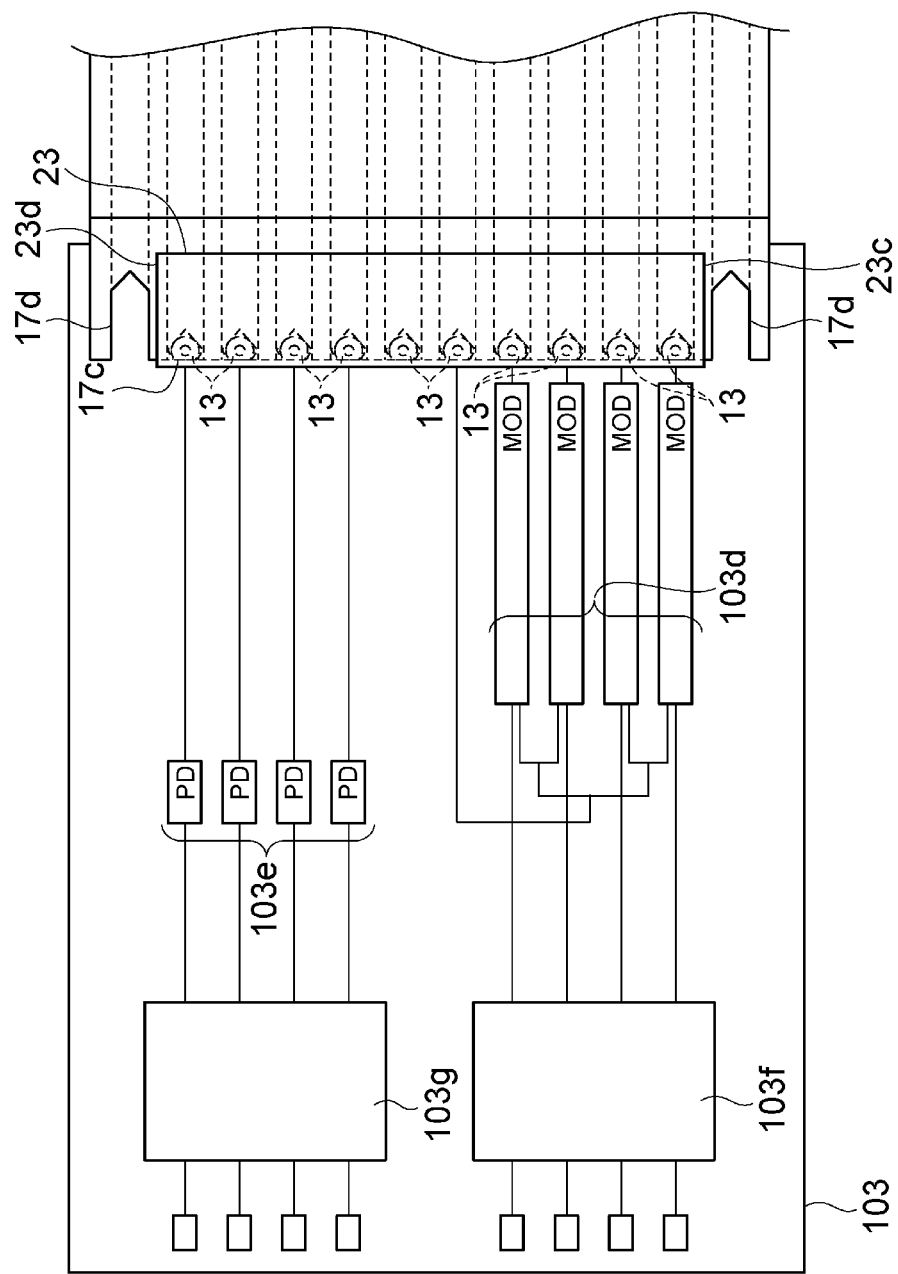
FIG. 7 is a plan view schematically showing optical coupling of the optical device and the silicon photonics device according to the present embodiment.

FIG. 6 is a plan view schematically showing the optical device and a silicon photonics device according to the present embodiment. FIG. 7 is a plan view schematically showing optical coupling of the optical device and the silicon photonics device according to the present embodiment. As shown in FIG. 6, the arrangement pitch of the optical fibers 13 in the optical device 11 matches pitch PT of grating couplers GC of the silicon photonics device which is referred to as the semiconductor optical device 103. As shown in FIG. 7, the optical device 11 is optically positioned on the major surface 103c of the semiconductor optical device 103, and the arrangement of the optical fibers 13 of the optical device 11 is optically coupled to the arrangement of the grating couplers GC of the silicon photonics device.

Referring to FIGS. 6 and 7, the grating couplers GC are arranged one side of the silicon photonics device for input of external light and/or output of light to and from the silicon photonics device. Four of the arranged grating couplers GC are connected to optical modulators 103d such as Mach-Zehnder modulator via optical waveguides, and is used for output of modulated light. One of the grating couplers GC is connected to the optical modulators 103d via an optical waveguide and is used to receive input light before modulation. Four of the arranged grating couplers GC are connected to incident photodiodes 103e via optical waveguides and are used for input of signal light.

In an optical transmitter, input light is divided into four optical waveguides, and is provided for the four Mach-Zehnder modulators (MOD). Electrical signals for modulation are supplied from a driver circuit 103f to the MODs via a conductive line. According to the electrical signals, each MOD performs modulation (such as amplitude modulation, phase modulation) of input light. The MODs are connected to respective grating coupler GC via optical waveguides, and modulated light is outputted from each grating coupler GC.

In an optical receiver, multiple light signals are received by the grating couplers GC, and the received light signals are input to respective pin-type photodiodes (PD) via optical waveguides. Each pin-type photodiode generates electrical signals such as photocurrents according to the received optical signals. These electrical signals are provided for a signal processing circuit 103g such as a trans-impedance amplifier, and desired processing such as amplification is performed.

The semiconductor optical device 103 is not limited to a silicon photonics device, and may be a semiconductor optical device, for instance, a surface emitting laser, a distributed feedback (DFB) semiconductor laser with an oblique reflective mirror, or a surface-incident photodiode. In a surface emitting laser, a DFB semiconductor laser with an oblique reflective mirror, or a surface-incident photodiode, the incident direction and/or outgoing direction from each optical device is, for instance, perpendicular to the surface of the optical device. On the other hand, in a Si photonics device having a grating coupler GC for input/output of light, the incident direction and/or outgoing direction is inclined at an angle of 5 to 15 degrees with respect to the surface of the optical device. The form of an optical beam reflected by an oblique reflective surface spreads during transmission through the cladding of each optical fiber 13. According to the knowledge of the inventor, as shown in FIG. 5A, when distance DT is 25 μm or less and greater than zero, highly efficient optical coupling (−1 dB or less) is achieved.

In an embodiment in which the optical fiber 13 of the optical device 11 is a single mode silica fiber and the semiconductor optical device 103 is a silicon photonics device with a grating coupler GC, the distance ("DT" shown in FIG. 6) between the cladding surface 13e of each optical fiber 13 and the outer circumference of the core 13c of the optical fiber 13 in the second end surface 17j is preferably 25 μm or less, and the first angle BETA formed by the normal axis NV of the major surface 103c and the second axis Ax2 is preferably in a range of 5 to 15 degrees. With such an optical arrangement, it is possible to provide highly efficient optical coupling between the optical device 11 and the semiconductor optical device 103. In order to provide optical coupling with an angle in the angle range, the second angle ALPHA formed by the second end surface 17j and the third end surface 17k is in a range of 42.5 to 37.5 degrees.

FIGS. 8A to 8C are views schematically showing an experiment conducted by the inventor. In the experiment, an optical fiber is optically coupled to an optical waveguide of a silicon photonics device with a grating coupler. FIG. 8A shows a reflective coupling optical system C1 in which light which has transmitted an optical fiber is reflected by an oblique polished surface of an optical connector, the path of light is changed to a direction approximately 8-degree off with respect to the normal to the major surface of the silicon photonics device, and the light is optically coupled to the silicon photonics device. FIG. 8B shows a direct coupling optical system C2 in which a polished optical fiber end with an angle approximately 8-degree off is optically coupled to the silicon photonics device directly (without reflection). A great number of reflective coupling optical systems C1 and a great number of direct coupling optical systems C2 are prepared and optical coupling loss of these optical systems is measured. The device in a reflective coupling optical system C1 exhibits a higher optical coupling loss than the optical coupling loss in a direct coupling optical systems C2. Also, the optical coupling loss in a reflective coupling optical system C1 exhibits a large variation depending on a lot of an optical connector or a channel position in a holder of an optical connector.

The inventor has conducted a further experiment as shown in FIG. 8C. In the experiment, a near field pattern (NFP) of light reflected by an oblique end surface in a reflective coupling optical system C1 is observed. According to the observation, it has been found that in addition to the original reflective component, the NFP in the reflective coupling optical system C1 includes a component of scattered light. An increase in the scattered component is caused by insufficient optical flatness of an oblique fiber end surface which is fabricated when the oblique end surface is produced, and the scattered light component due to the oblique end surface causes optical loss. It is desired to reduce such light scattering.

Figure 9:
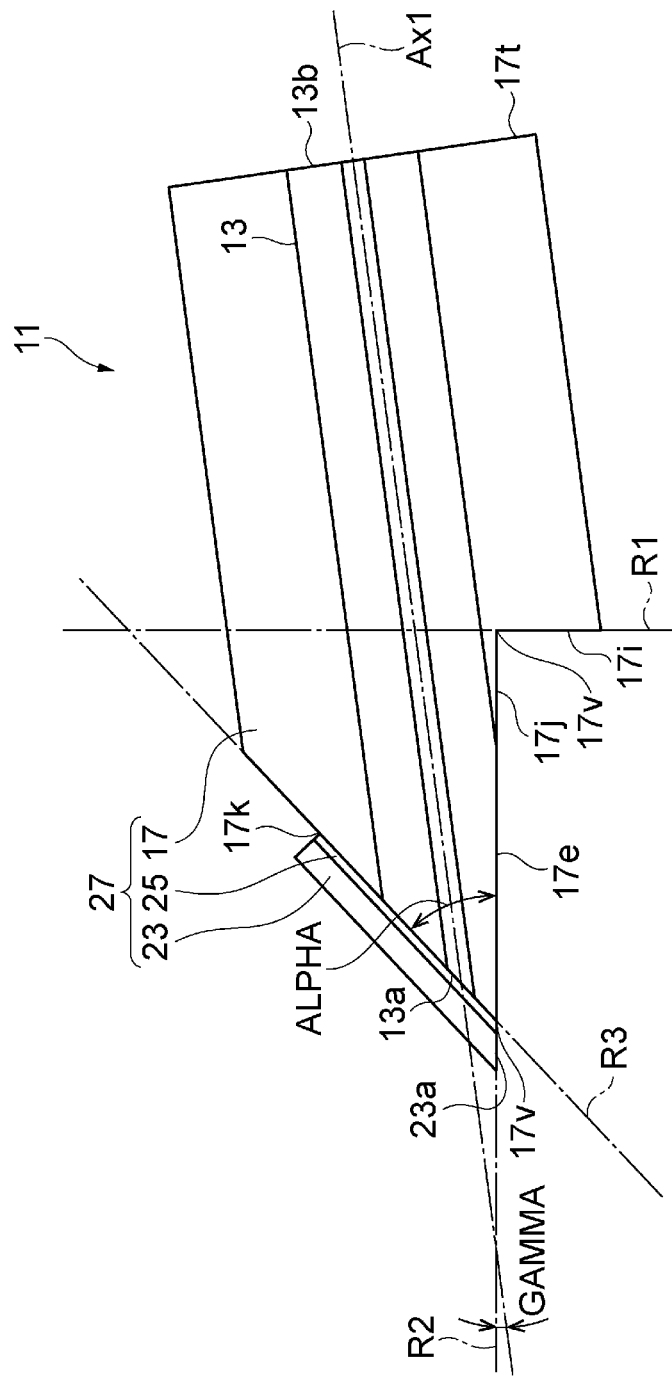
FIG. 9 is a view schematically showing an optical device that is able to reduce the influence of roughness in the end surface of one end of an optical fiber in a third end surface.

FIG. 9 is a view schematically showing an optical device that is able to reduce the influence of roughness in the end surface of the facet 13a of an optical fiber 13 in the third end surface 17k. In order to facilitate achievement of the first angle BETA as well as formation of the second angle ALPHA shown in FIG. 5, the first axis Ax1 (the waveguide axis along which the optical fiber 13 in the supporting block 17 extends) preferably forms a third angle GAMMA greater than zero with respect to the second reference plane R2 (the plane on which the second end surface 17j extends). With this structure, compared with the case where a desired first angle BETA is achieved in the optical device 11 shown in FIG. 1, the value of the second angle ALPHA for achieving the first angle BETA in the same degree is increased. The second angle ALPHA is defined as the angle formed by the second reference plane R2 and the third reference plane R3. Since the thickness of the intermediate layer 25 is substantially uniform on the third end surface 17k, the second angle ALPHA may be utilized as the angle formed by the reflective surface 23a and the second reference plane R2. As an instance, when the first angle BETA is 8 degrees, the second angle ALPHA is 41 degrees in the structure of FIG. 1. On the other hand, when the third angle GAMMA is set to 10 degrees, in order to form the first angle BETA of 8 degrees, the second angle ALPHA has to be 46 degrees. Also, with this structure, the connection part 17v can be machined to be positioned not in the optical fiber 13 but in the supporting block 17. With this structure, it is possible to reduce application of stress caused by the connection part 17v to the optical fiber 13.

Figure 10:
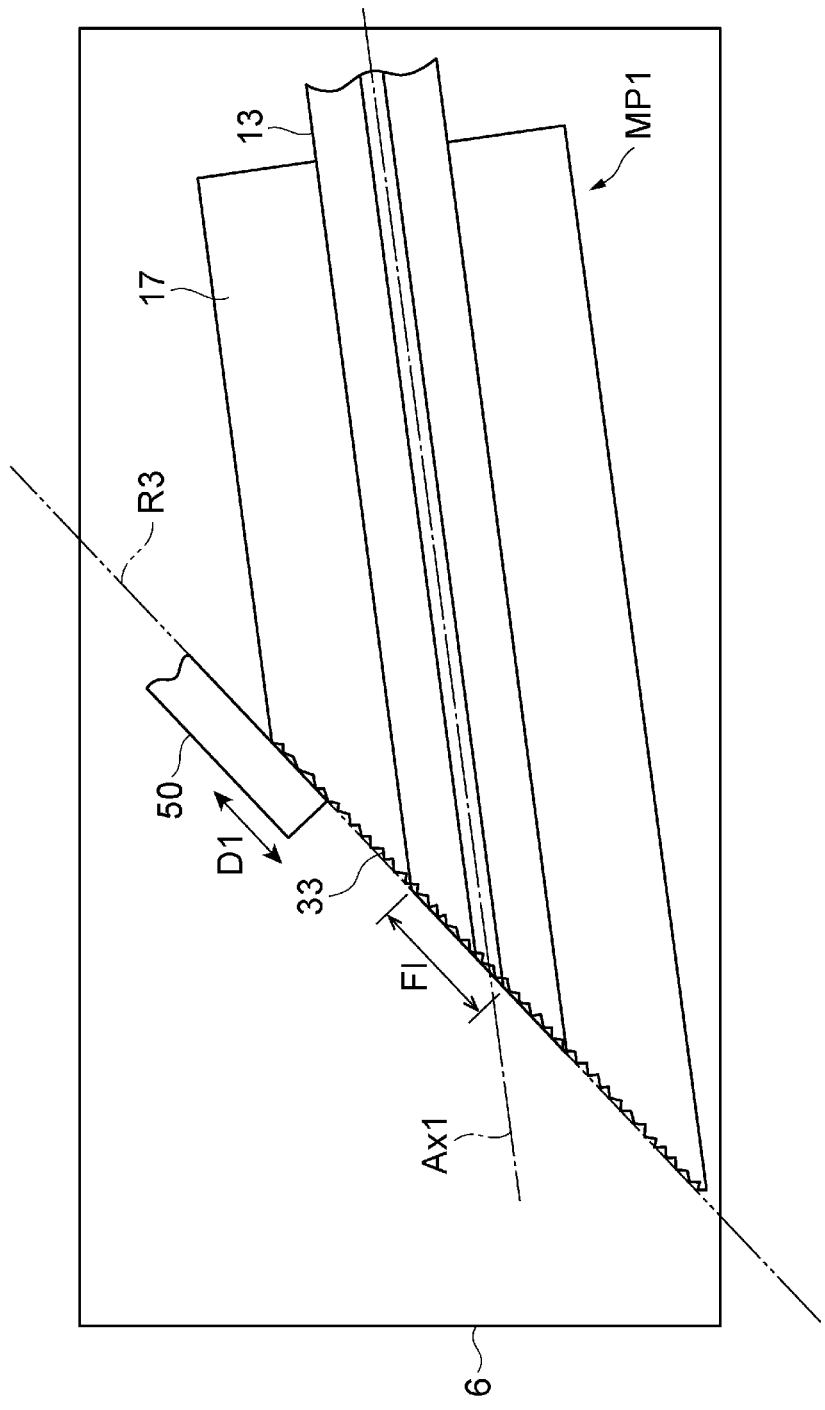
FIG. 10 is a view showing an assembly object that is cut using a dicing blade of a dicing machine.
Figure 11:
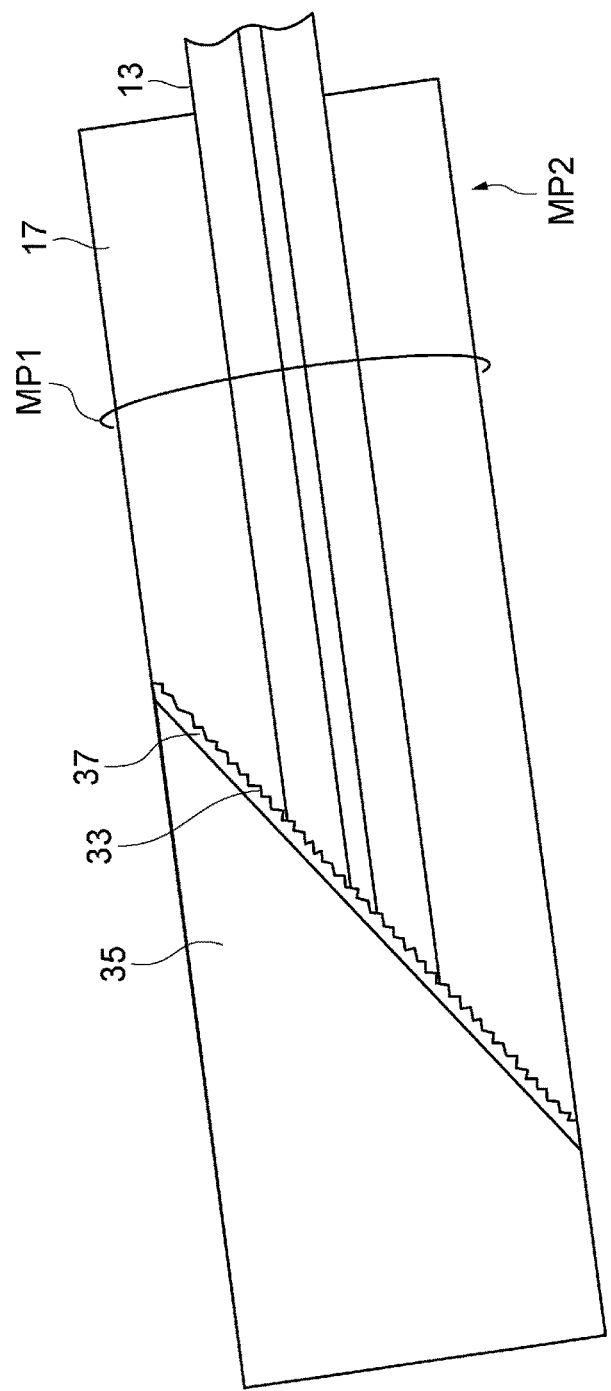
FIG. 11 is a view showing a process of disposing a reflecting portion for a reflecting block on an oblique end surface of an intermediate product MP1.
Figure 12:
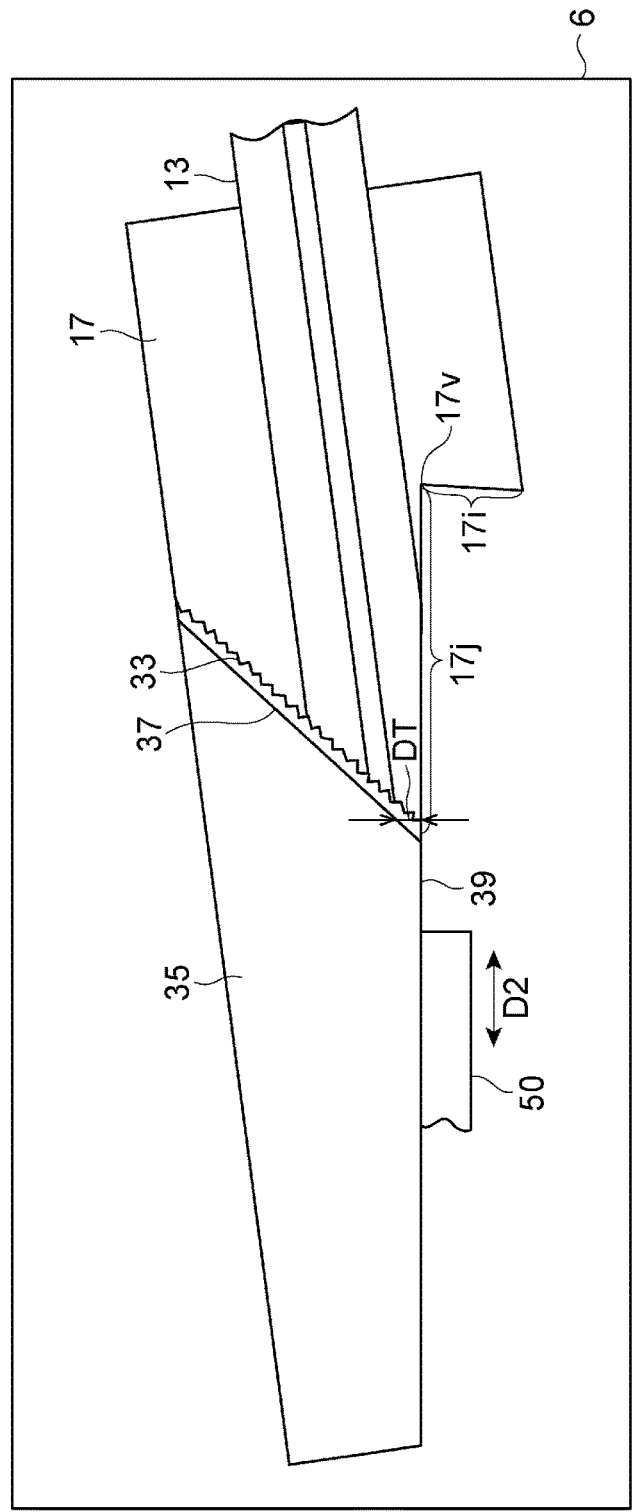
FIG. 12 is a view showing a process of forming an incision in other intermediate product MP2 using the dicing blade of the dicing machine.

Also, the structure shown in FIG. 9 provides an advantage in producing an oblique end surface. Optical fiber components for the optical fiber 13 and components for the supporting block 17 are assembled to produce an assembly object. In the assembly object, the optical fiber components extend in the direction of the first axis Ax1. As shown in FIG. 10, the assembly object is cut in D1 direction using a dicing blade 50 of a dicing machine 6. The cutting is performed by moving the dicing blade 50 along the third reference plane R3 which is inclined at an angle (angle greater than zero) with respect to a plane perpendicularly intersecting the first axis Ax1. An oblique end surface 33 having a roughness is formed in the assembly object by machining using the dicing blade 50, and an intermediate product MP1 is produced. The oblique end surface 33 includes a facet of the optical fiber 13. Next, as shown in FIG. 11, a reflecting block 35 for the reflecting plate 23 is arranged on the oblique end surface 33 of the intermediate product MP1. The reflecting block 35 has a mirror-like surface flatter than the oblique end surface 33. When the arrangement is made, an optical resin layer 37 for the intermediate layer 25 is formed so as to cover the oblique end surface 33. The optical resin layer 37 is provided between the reflecting block 35 and the oblique end surface 33. Other intermediate product MP2 is produced from the intermediate product MP1, the reflecting block 35, and the optical resin layer 37. The oblique end surface 33 has a roughness which may have influence on transmission and reflection of light, and the roughness is caused by machining using the dicing blade 50. The optical resin layer 37 comes into contact with the oblique end surface 33 formed by machining using the dicing blade 50, thereby reducing the influence of the roughness of the oblique end surface 33 on transmission and reflection of light. As shown in FIG. 12, an incision is made in the other intermediate product MP2 in D2 direction using the dicing blade 50 of the dicing machine 6. A lateral surface 39 is formed in the other intermediate product MP2 by the incision. Although the cladding of the optical fiber 13 appears in the lateral surface 39, the core of the optical fiber 13 does not appear.

The third angle GAMMA shown in FIG. 9 is related to the second direction D2 which defines the incision angle of the dicing blade 50. In this manner, the second end surface 17j is formed by the incision using the dicing blade. When necessary, the lateral surface 39 may be polished so that the cladding surface 13e has a desired shape in the second end surface 17j. Quantity of needed polish may be estimated by the length (the length of the cladding surface 13e) defined in the direction of the second reference plane R2 and the third angle GAMMA. Control of the distance DT is facilitated by the machining. After the machining, when needed, an antireflection film may be formed on the second end surface 17j and the cladding surface 13e.

Figure 13A:
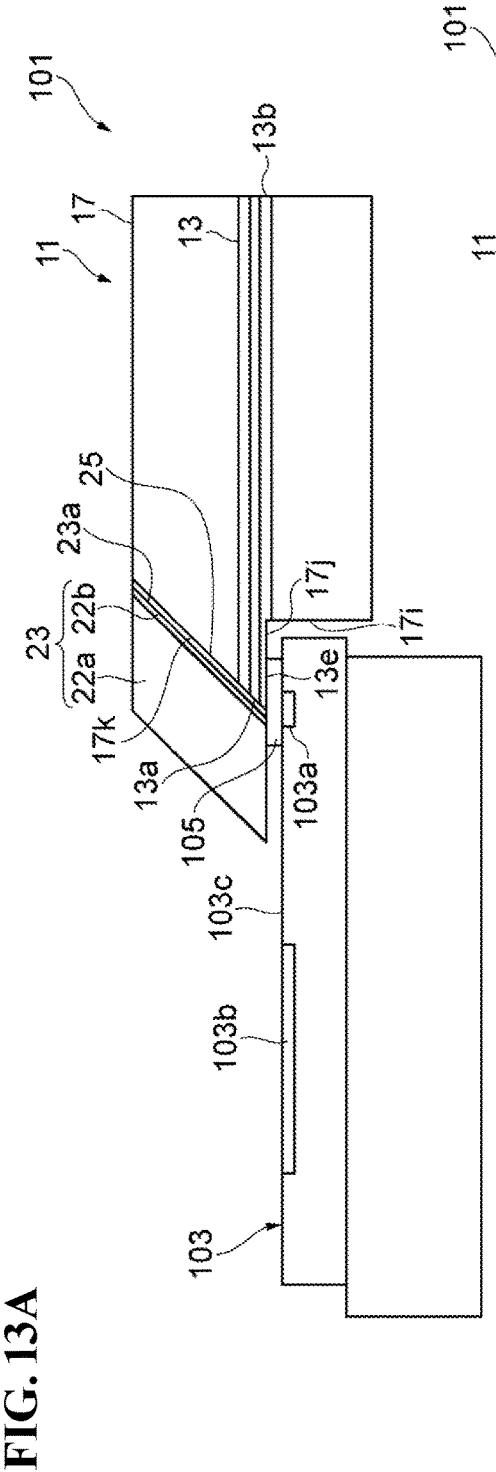
FIGS. 13A and 13B are views showing an optical device provided with a reflecting block including a base and a reflection film that provides a reflective surface.
Figure 13B:
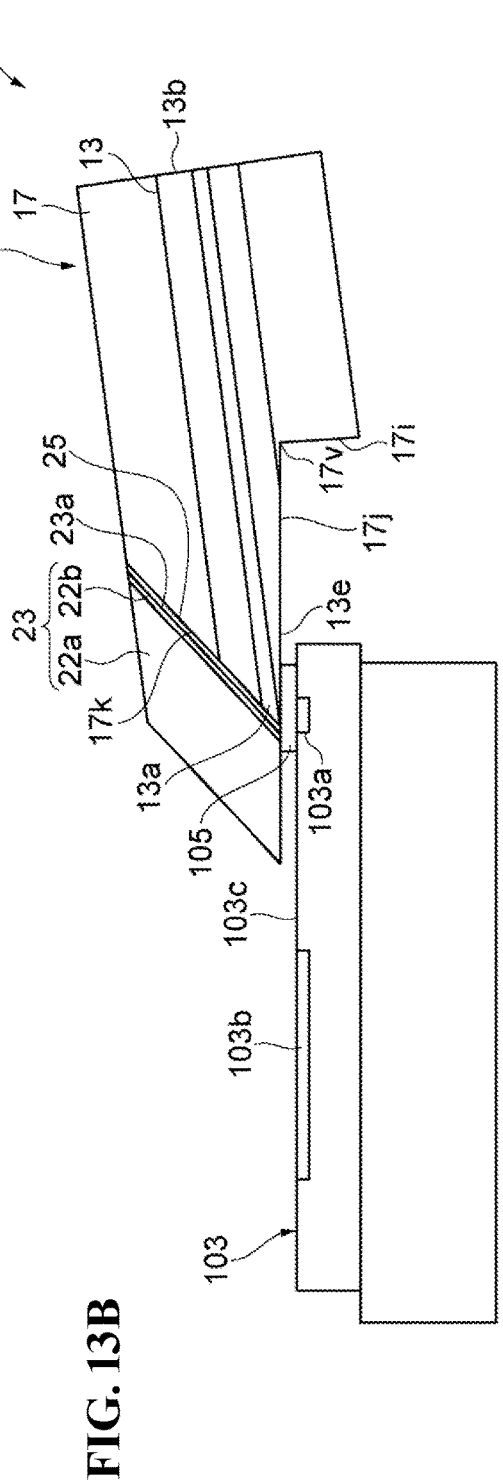

As shown in FIGS. 13A and 13B, the reflecting plate 23 may include the base 22a and the reflection film 22b that provides the reflective surface 23a. The reflection film 22b is provided on the base 22a. The reflection film 22b includes either one of a metal film (for instance, Ti/Au), a dielectric multilayer (for instance, $TiO_2/SiO_2$), and a composite film (for instance, $Al_2O_3/Ag/Al_2O_3$) of a metal and a dielectric multilayer. The reflecting plate 23 may include a desired reflection film 22b on the base 22a of the reflecting plate 23 or the reflecting plate 23 may have a reflective surface 23a (polished surface of the base 24) having a desired reflectance.

Figure 14A:
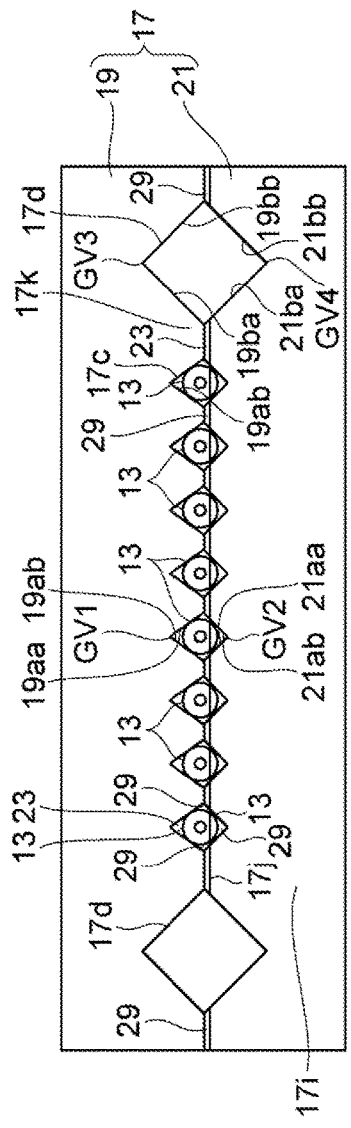
FIGS. 14A and 14B are views showing a supporting portion according to the present embodiment.
Figure 14B:
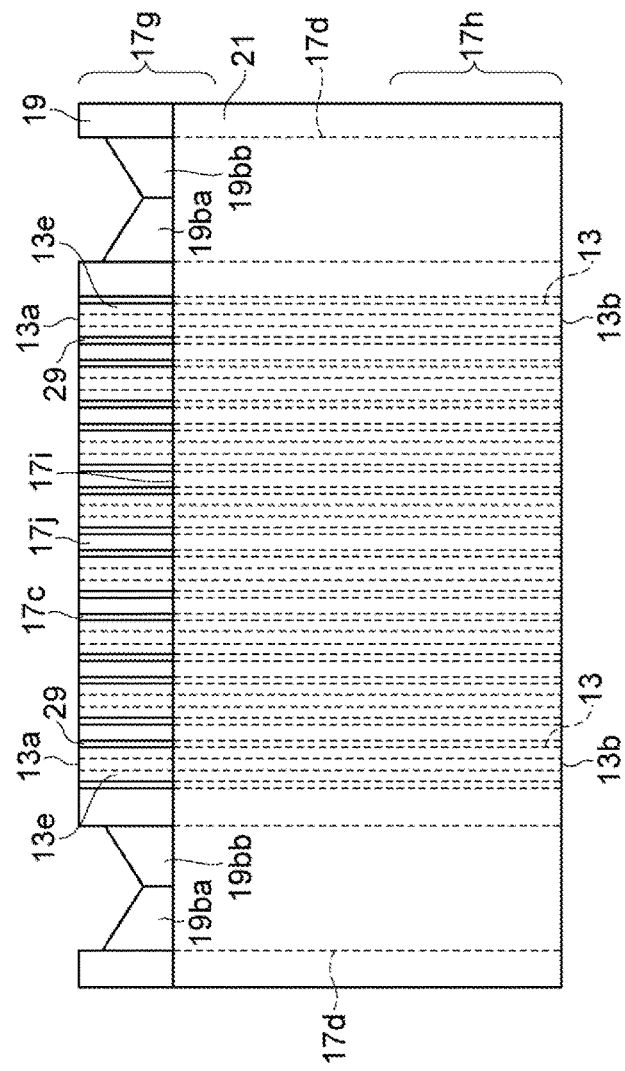

FIGS. 14A and 14B are views showing a supporting portion according to the present embodiment. Referring to FIGS. 14A and 14B, the supporting portion 17c of the supporting block 17 includes through holes extending from the first end surface 17i and the third end surface 17k in the direction from the one end 17g to the other end 17h, and each optical fiber 13 is fixed to the supporting block 17 in one of the through holes by an adhesive member 29. The arrangement of the optical fibers 13 is defined by the arrangement of the through holes. Also, each guiding portion 17d of the supporting block 17 includes a through hole extending from the first end surface 17i and the third end surface 17k in the direction from the one end 17g to the other end 17h. For instance, a guide pin is inserted in the guiding portion 17d.

The supporting block 17 includes a first block 19 and a second block 21. The first block 19 has first grooves GV1 for supporting the corresponding optical fibers 13, and each first groove GV1 has a first inner surface 19aa and a second inner surface 19ab. The second block 21 has second grooves GV2 for supporting the corresponding optical fibers 13, and each second groove GV2 has a third inner surface 21aa and a fourth inner surface 21ab. The first block 19 and the second block 21 are bonded together by the adhesive member 29 so that the first groove GV1 and the second groove GV2 form the above-mentioned through hole. The first block 19 has third grooves GV3 as a guide, and each third groove GV3 has a fifth inner surface 19ba and a sixth inner surface 19bb. The second block 21 has fourth grooves GV4 as a guide, and each fourth groove GV4 has a seventh inner surface 21ba and an eighth inner surface 21bb. The first block 19 and the second block 21 are bonded together by the adhesive member 29 so that the third groove GV3 and the fourth groove GV4 form the above-mentioned through hole. In the present embodiment, each of the first groove GV1 to the fourth groove GV4 includes a V groove, for instance.

Figure 15:
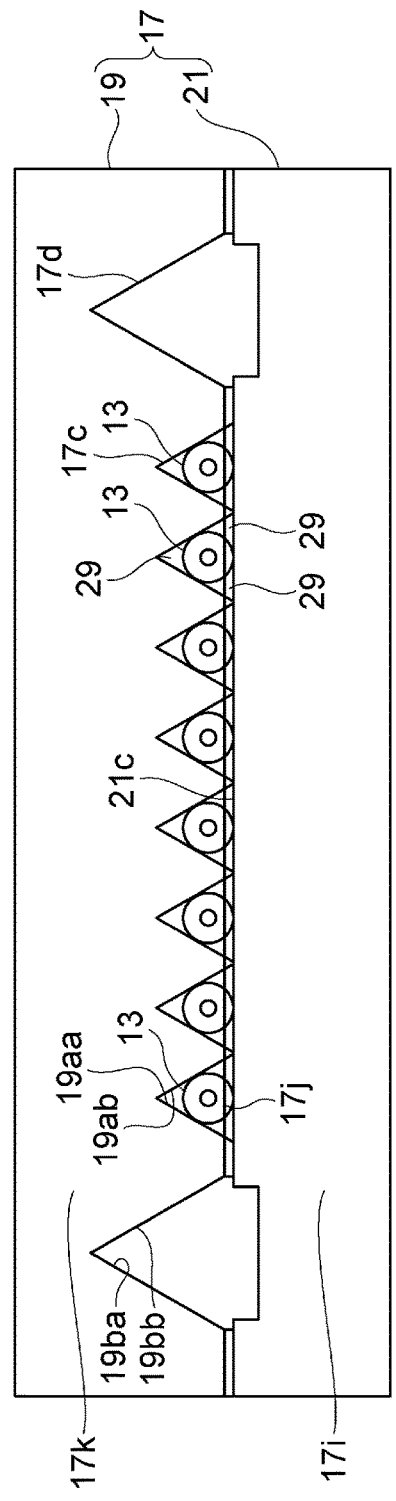
FIG. 15 is a view showing another structure of the supporting portion according to the present embodiment.

The supporting block 17 may have a structure as shown in FIG. 15. Referring to FIG. 15, although the first block 19 includes the first grooves GV1 shown in FIG. 15, the second block 21 supports the optical fibers 13 by a common flat surface 21c without using a groove.

In the optical device 11 using the supporting block 17 shown in FIGS. 14A, 14B and 15, as the first block 19 and the second block 21, a glass block made of heat resistant glass is used. V-type grooves are formed in the glass block, and in the optical device 11 shown in FIGS. 14A and 14B, as the first block 19 and the second block 21, a glass block in substantially the same structure is used. An optical fiber is inserted in each V groove of the glass blocks, and glass components and optical fiber components are bonded to each other by the adhesive member 29 such as heat resistant adhesive. As such a heat resistant adhesive, for instance, a heat curable epoxy adhesive may be used, and after the adhesive is cured (in other words, after the adhesive is applied), the adhesive exhibits a small volume change for a temperature change of the glass components. In order to accurately align the optical fibers with a desired position by the V grooves, each optical fiber is made to come into contact with four oblique surfaces of two V grooves of the glass components. To achieve the above support, two glass components interposing an optical fiber spaced apart by a gap of 1 to 5 μm by the support via the optical fiber without being in contact with each other. The V grooves of the two glass components and the gap are filled with a heat resistant adhesive. Therefore, the heat resistant adhesive is in contact with the entire outer circumference of the cladding of the optical fiber except for a portion where the optical fiber is in contact with the V grooves. The supporting block 17 includes the adhesive member 29 which tightly fills the space between the first block 19, the second block 21 and the optical fibers 13.

According to the illustration which has been already described, after the oblique end surface 33 for the third end surface 17k of the holder 27 is formed by cutting using a dicing blade of a dicing machine, a resin layer for the intermediate layer 25 is formed on the oblique end surface 33 and the components for the reflecting plate 23 are mounted on the resin layer. The components for the reflecting plate 23 are cut from one end of the components up to the supporting block 17 by a dicing blade, and the first end surface 17i and the second end surface 17j of the supporting block 17 are formed. In order to form the oblique end surface 33 for the third end surface 17k, the glass components for the first block 19 and the second block 21, and the optical fiber components are machined by the dicing blade. In order to form the first end surface 17i and the second end surface 17j, the glass components for the first block 19 and the second block 21, the optical fiber components, the reflecting block 35, and the optical resin layer 37 for the intermediate layer 25 are machined by the dicing blade. According to the experiment by the inventor, in contrast to the structure supporting the optical fibers by four surfaces using two V grooves, the structure supporting the optical fibers by three surfaces with one V groove and the flat surface 21c can reduce the occurrence of damage of the optical fiber components and peeling of the adhesive in a groove.

Figure 16:
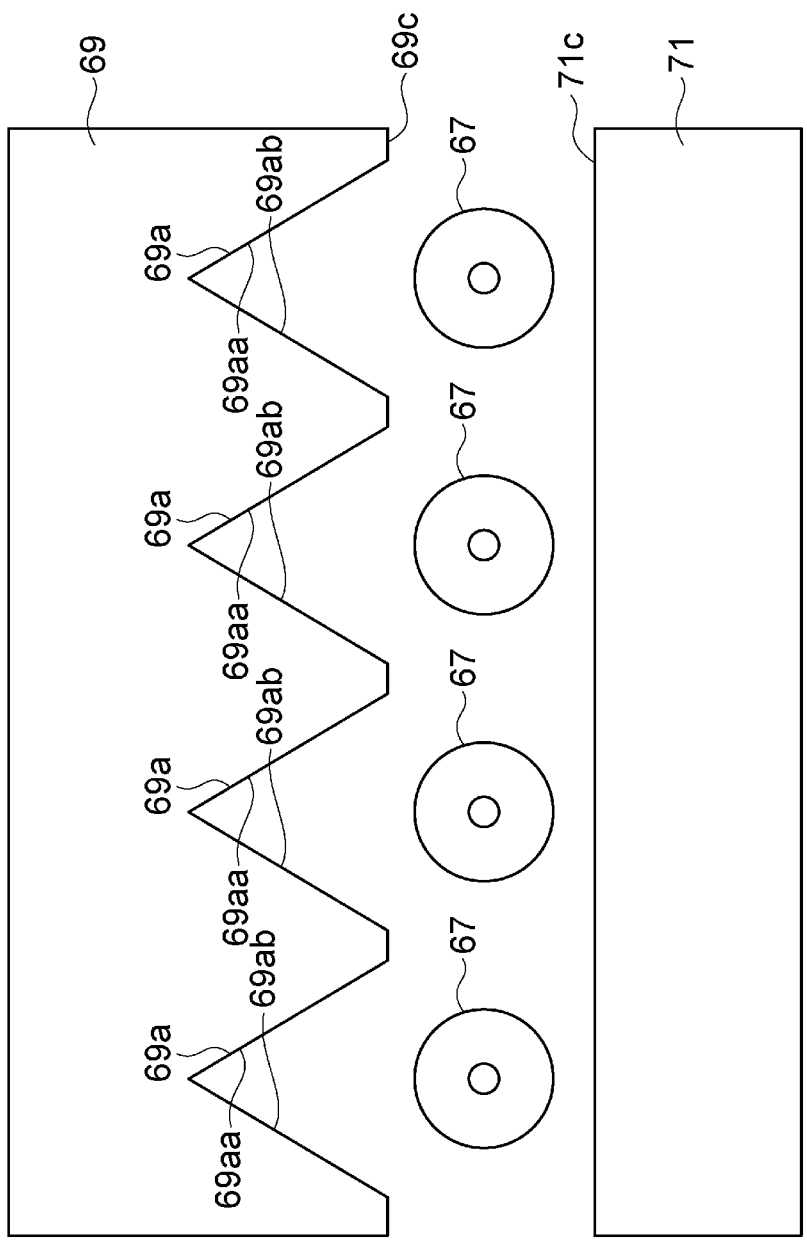
FIG. 16 is a view showing a part of a major step in a method of producing the optical device according to the present embodiment.

Referring to FIGS. 16 to 22, major steps in a method of producing the optical device 11 will be described. As shown in FIG. 16, optical fiber components (optical fiber part) 67 for the optical fibers 13, a first component 69 for the first block 19, and a second component 71 for the second block 21 are prepared. In the present embodiment, the first component 69 has multiple support grooves 69a corresponding to the first grooves GV1 that support the optical fibers 13, and each support groove 69a has a first inner surface 69aa and a second inner surface 69ab respectively corresponding to the first inner surface 19aa and the second inner surface 19ab. The support groove 69a may be, for instance, a V groove. The multiple support grooves 69a are provided in a surface 69c of the first component 69. The second component 71 has a third supporting surface 71c which is wider than the arrangement width of the support grooves 69a in the first component 69.

Figure 17:
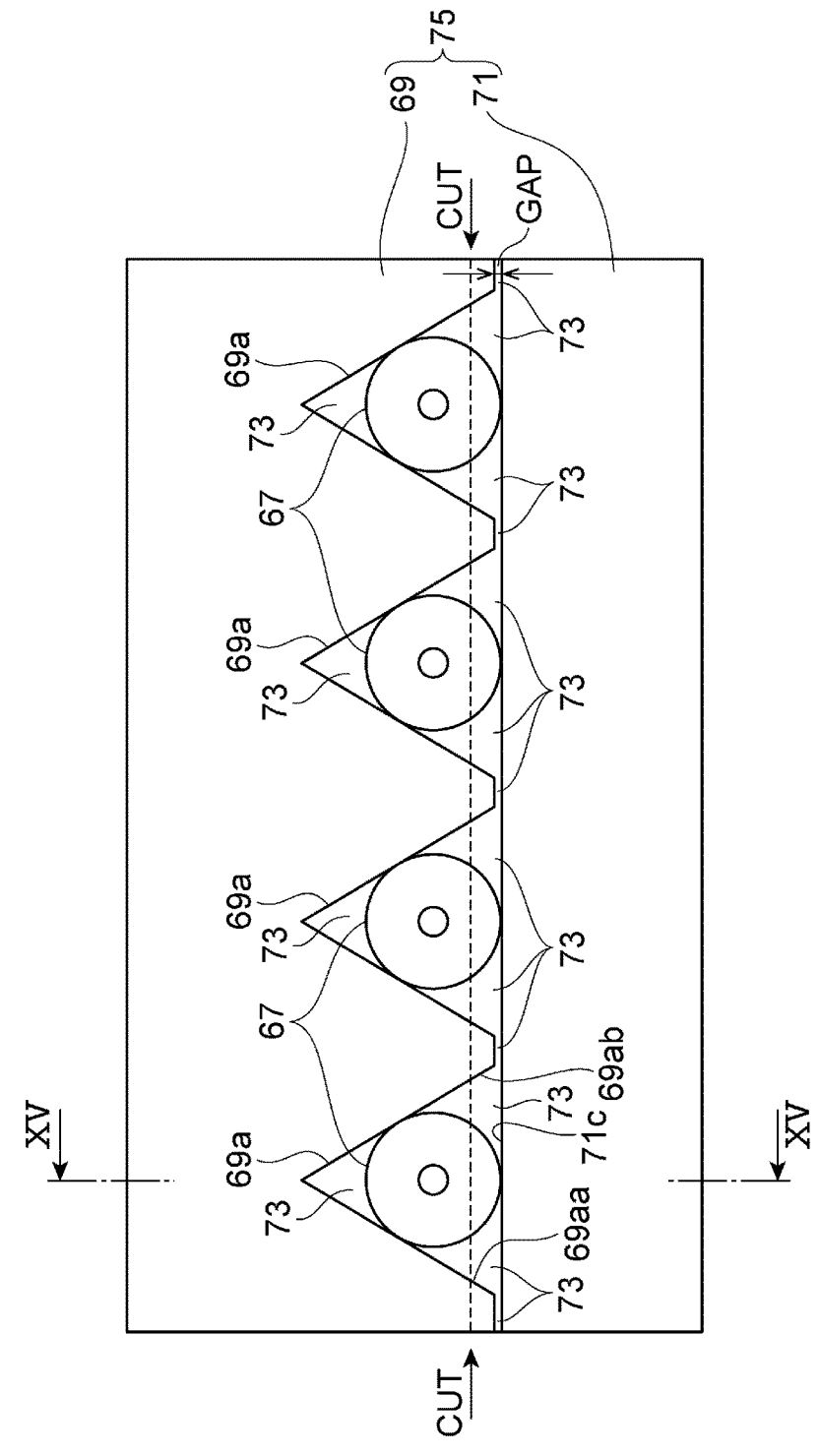
FIG. 17 is a view showing a part of a major step in a method of producing the optical device according to the present embodiment.
Figure 18:
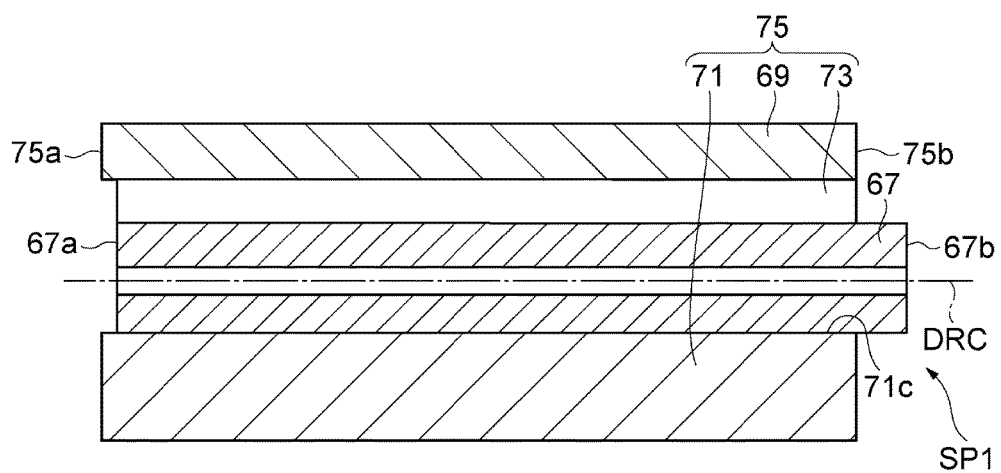
FIG. 18 is a view showing a part of a major step in a method of producing the optical device according to the present embodiment.

As shown in FIG. 17, the multiple optical fiber components 67 are disposed in the respective multiple support grooves 69a so that the optical fiber components 67 are interposed between the first component 69 and the second component 71. A space GAP is formed between the first component 69 and the second component 71. Adhesive is provided so that an adhesive member 73 fills the space between the optical fiber components 67 and the first component 69, the second component 71. In this step, a first body part SP1 is formed. The first body part SP1 includes a supporting member 75 and the optical fiber components 67. The supporting member 75 includes the adhesive member 73, and the first component 69 and the second component 71 bonded by the adhesive member 73. As shown in FIG. 18, the supporting member 75 has one end 75a and the other end 75b. Each optical fiber component 67 is supported by the supporting member 75 within the supporting member 75, and extend in a first direction DRC from the one end 75a to the other end 75b. In consideration of end surface machining, the one end 67a of the optical fiber component 67 is depressed with respect to the one end 75a, whereas the other end 67b of the optical fiber component 67 projects from the other end 75b.

Figure 19:
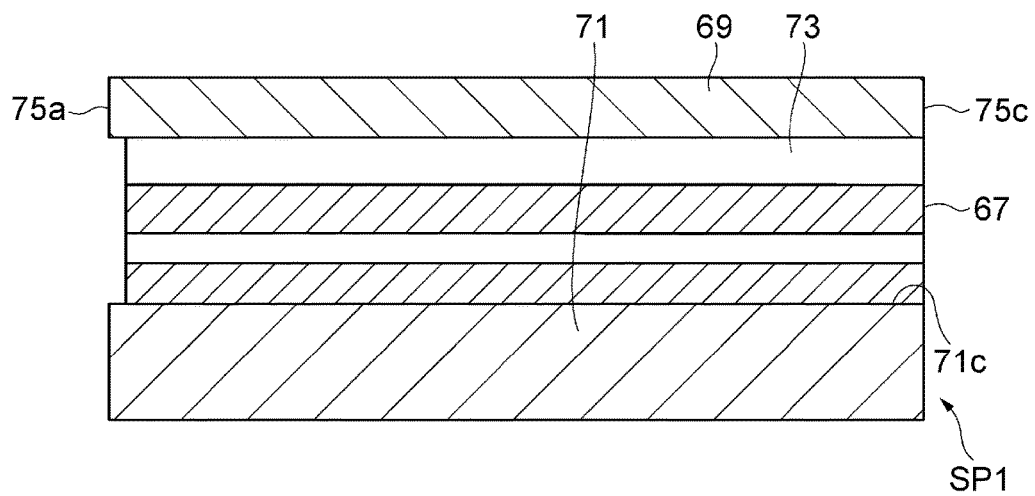
FIG. 19 is a view showing a part of a major step in a method of producing the optical device according to the present embodiment.

As shown in FIG. 19, when a stub-type is produced, the other end 75b of the supporting member 75 is polished to form a polished surface 75c of the supporting member 75. The supporting member 75 of the first body part SP1 has the one end 75a and the polished surface 75c.

Figure 20:
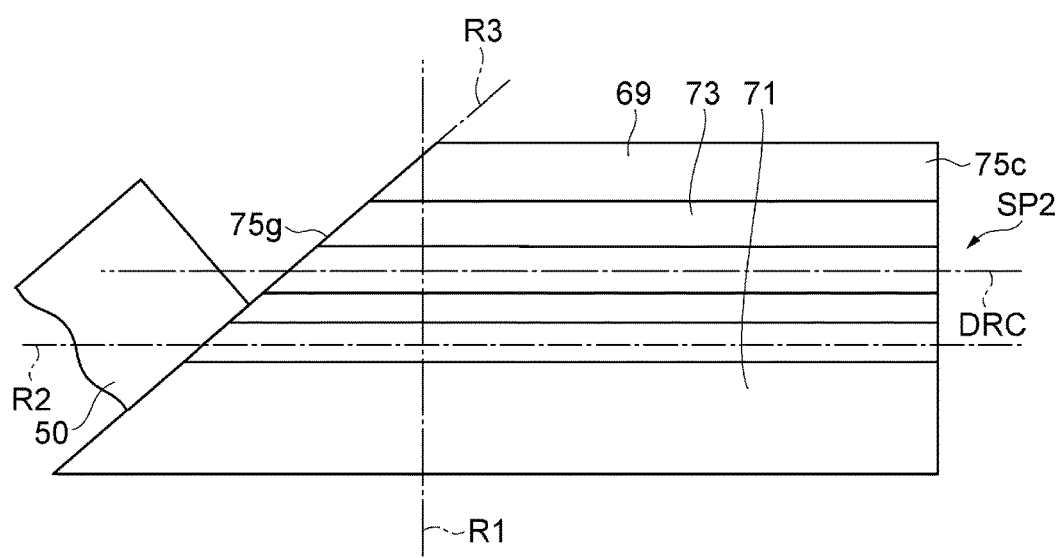
FIG. 20 is a view showing a part of a major step in a method of producing the optical device according to the present embodiment.

In the present embodiment, after the first body part SP1 is produced, as shown in FIG. 20, the one end 75a of the supporting member 75 and the optical fiber component 67 are cut using the dicing blade 50 of the dicing machine, and the second body part SP2 having a machined surface 75g for the third end surface 17k is formed. The machined surface 75g extends along the third reference plane R3 that is oblique with respect to the first reference plane R1 and the second reference plane R2. The machined surface 75g includes a facet of the optical fiber component 67.

Figure 21:
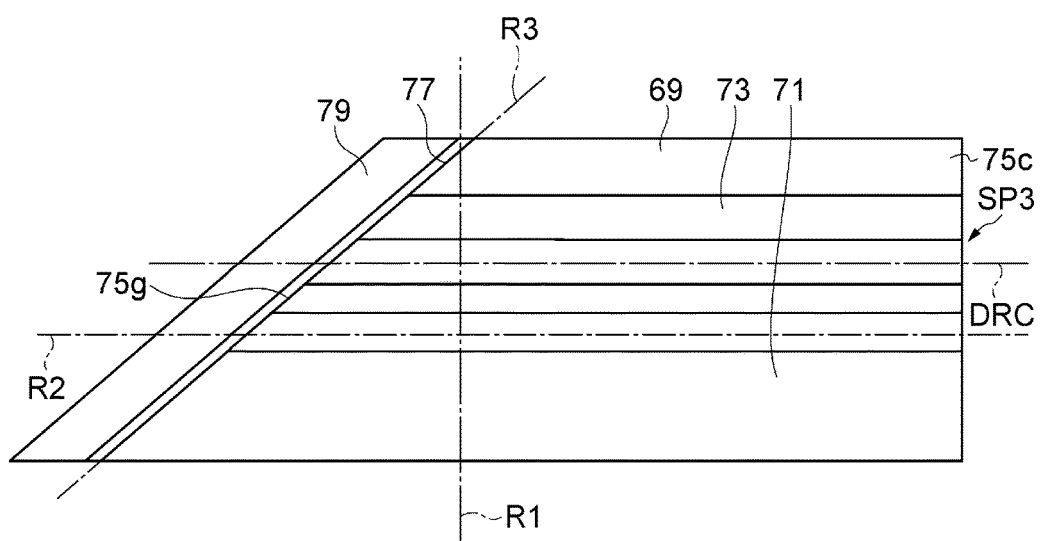
FIG. 21 is a view showing a part of a major step in a method of producing the optical device according to the present embodiment.

After the second body part SP2 is produced, as shown in FIG. 21, a resin layer 77 for planarization is applied to the machined surface 75g and a reflecting member 79 for the reflecting plate 23 is mounted on the resin layer 77. The size of the reflecting member 79 is such that all of the multiple facets 13a (cores and claddings) in the machined surface 75g are covered and four lateral ends of the reflecting member 79 are separated from the edges of the facets 13a in the machined surface 75g. This assembly produces a third body part SP3.

Figure 22:
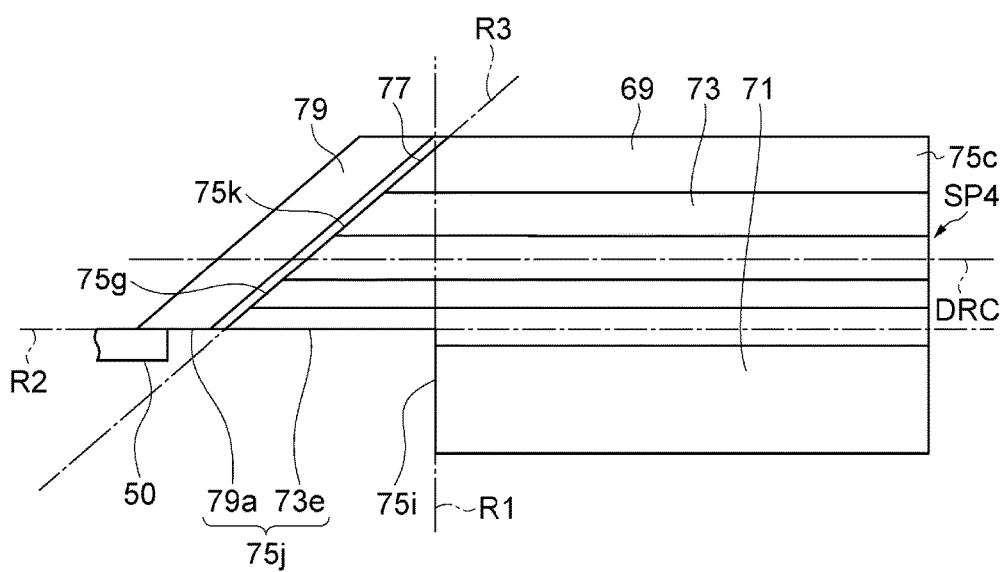
FIG. 22 is a view showing a part of a major step in a method of producing the optical device according to the present embodiment.

In the present embodiment, after the third body part SP3 is produced, as shown in FIG. 22, the optical fiber component 67, the supporting member 75, the resin layer 77 and the reflecting member 79 are machined using the dicing blade 50 of the dicing machine, and a fourth main component SP4 having a first surface 75i and a second surface 75j is formed. The first surface 75i extends along the first reference plane R1 that intersects the first direction DRC. The second surface 75j extends from the one end 75a in the direction from the one end 75a to the other end 75b along the second reference plane R2 that intersects the first reference plane R1. In the present embodiment, the first reference plane R1 is substantially perpendicular to the first direction DRC, and the second reference plane R2 may extend substantially parallel to the first direction DRC. An incision is made in the third body part SP3 using the dicing blade 50 so that the first surface 75i is formed along the first reference plane R1. The depth of the incision is reduced by the thickness of the edge of the dicing blade 50 forming the second surface 75j from the depth up to the line CUT (the position where the cladding surface 13e is to be formed) shown in FIG. 17. Next, an incision is made in the third body part SP3 using the dicing blade 50 so that the second surface 75j is formed along the second reference plane R2. The depth of the incision is such that the edge of the dicing blade 50 reaches the incision portion which is formed for the first surface 75i. The position of the second reference plane R2, in other words, the position of the incision made by the edge of the dicing blade 50 is determined so that the core of the optical fiber component 67 is off from the edge and the cladding of the optical fiber component 67 is allowed to be cut in the first direction DRC. The position is indicated by the line CUT in FIG. 17. The second surface 75j includes a lateral surface 79a of the reflecting member 79 and the cladding surface 73e.

The shape of the cladding surface 73e and the distance between the cladding surface 73e and the outer circumference of the core are adjustable by polishing the second surface 75j of the fourth main component SP4. In this manner, the major steps in the method of producing the optical device 11 are completed.

According to the production method, the first body part SP1 including the optical fiber component 67 and the supporting member 75 is machined, and the machined surface 75g extending along the third reference plane is formed in the first body part SP1. The resin layer 77 and the reflecting member 79 are provided on the machined surface 75g of the second body part SP2, and the third body part SP3 is formed. In the formation of the second body part SP2, part of all of the machined surface 75g is covered with the optical resin body of the resin layer 77, then the reflecting member 79 is provided on the resin layer 77. The first surface 75i extending along the first reference plane R1 intersecting the direction of the first axis Ax1 the second surface 75j extending along the second reference plane R2 in the direction of the first axis Ax1 are formed by machining the second main component. Thus produced fourth main component SP4 allows the light transmitting the optical device 11 to be reflected not by the interface between the machined surface 75g and the optical resin body, but by the machined reflecting member 79 (the reflective surface 23a of the reflecting plate 23). The reflected light is emitted from the optical device 11 through the second surface 75j.

By the production method, an incision is made in the third body part SP3 using the dicing machine, thereby making it possible to form the fourth main component SP4 that has the first surface 75i extending along the first reference plane R1 and the second surface 75j extending along the second reference plane R2. The dicing blade 50 of the dicing machine for machining the second surface 75j extending along the second reference plane R2 is positioned so that the core of the optical fiber component 67 at one end is avoided from being cut and the cladding of the optical fiber component 67 is partially cut. Due to the incision, the cladding of the optical fiber component 67 appears in the second surface 75j. The depth of the incision defines the length of the cladding surface 17e.

As understood from the production steps described above, the first surface 75i, the second surface 75j and a third surface 75k (the rest of the machined surface 75g), for instance, correspond to the first end surface 17i, the second end surface 17j and the third end surface 17k shown in FIG. 1, respectively. Therefore, the cladding end of the optical fiber component 67 appears in the first surface 75i (the first end surface 17i), the cladding lateral surface of the optical fiber component 67 appears in the second surface 75j (the second end surface 17j), and the one end surface of the optical fiber component 67 is positioned in the third surface 75k (the third end surface 17k). According to the production method, machining the third body part SP3 makes it possible to form the first surface 75i in which the cladding end of the optical fiber component 67 appears, and the second surface 75j in which the cladding lateral surface of the optical fiber component 67 appears. Also, machining the second body part SP2 makes it possible to form the third surface 75k in which the one end surface of the optical fiber component 67 is positioned. The third surface 75k reaches the second surface 75j to form an acute angle.

Although the principle of the invention has been illustrated and described in a preferred embodiment, it should be understood by those skilled in the art that the invention may be modified in arrangement and detail without departing from the principle. The invention is not limited to the specific configurations disclosed by the present embodiment. We therefore claim all modifications and variations within the scope of the spirit of the following claims.

What is claimed is:

1. An optical device comprising:
   one or more optical fibers each including a core and a cladding surrounding the core; and
   a holder including:
   a supporting block having one end, an other end, and a supporting portion supporting the one or more optical fibers, the one end including a first, a second, and a third end surface;
   a reflecting plate provided on the third end surface, the reflecting plate having a reflective surface; and
   an intermediate layer including an optical resin provided between the third end surface and the reflecting plate, the intermediate layer having a refractive index comparable to a refractive index of the claddings of the one or more optical fibers, wherein
   the supporting portion extends in a direction of an axis from the on end to the other end,
   the first end surface of the one end extends from a bottom surface of the holder to the claddings of the one or more optical fibers along a first reference plane that intersects the axis,
   the second end surface of the one end and a lateral surface of the reflecting plate extend along a second reference plane in which lies the axis,
   the third end surface of the one end extends along a third reference plane that is oblique with respect to the axis at an angle greater than zero degrees and less than 90 degrees,
   the claddings of the one or more optical fibers are positioned in the second end surface,
   the one or more optical fibers have respective facets exposed in the third end surface, and
   the intermediate layer fills a gap between the facets of the one or more optical fibers and the reflective surface of the reflecting plate to thereby embed roughness of the facets exposed at the third end surface.

2. The optical device according to claim 1, wherein
   the supporting block has a through hole that extends from the one end to the other end,
   the reflecting plate has a side surface, and
   the side surface of the reflecting plate is arranged between an outermost fiber of the one or more optical fibers and the through hole in the third end surface.

3. The optical device according to claim 1, wherein the reflecting plate includes one of a metal film and a dielectric multilayer, or both the metal film and the dielectric multilayer.

4. The optical device according to claim 1, wherein
   the one or more optical film fibers are arranged along a plane parallel with the axis,
   the holder has a first area located between the claddings of the one or more optical fibers in the second end surface, and
   the facets of the one or more optical fibers are arrayed along a connecting edge which the second end surface and the third end surface share.

5. The optical device according to claim 1, wherein the one or more optical fibers include a first portion and a second portion, the first portion extending in the holder, and the second portion extending outward from the other end of the holder.

6. The optical device according to claim 1, wherein
   each of the one or more optical fibers extends from the one end to the other end within the holder.

7. The optical device according to claim 1, wherein the intermediate layer reduces light reflection and/or light scattering caused by the roughness of the facets.

\* \* \* \* \*